(12) United States Patent
El-Maleh et al.

(10) Patent No.: US 8,548,048 B2
(45) Date of Patent: Oct. 1, 2013

(54) VIDEO SOURCE RATE CONTROL FOR VIDEO TELEPHONY

(75) Inventors: Khaled Helmi El-Maleh, San Diego, CA (US); Ming-Chang Tsai, San Diego, CA (US); Yen-Chi Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1713 days.

(21) Appl. No.: 11/314,428

(22) Filed: Dec. 20, 2005

(65) Prior Publication Data

US 2007/0097257 A1   May 3, 2007

Related U.S. Application Data

(60) Provisional application No. 60/731,614, filed on Oct. 27, 2005.

(51) Int. Cl.
*H04N 7/18* (2006.01)

(52) U.S. Cl.
USPC .................................. 375/240.05; 375/240.26

(58) Field of Classification Search
USPC ........................................ 375/240.01–240.06
See application file for complete search history.

(56) References Cited

U.S. PATENT DOCUMENTS

| | | | |
|---|---|---|---|
| 4,774,587 A | 9/1988 | Schmitt | |
| 5,341,374 A | 8/1994 | Lewen et al. | |
| 5,367,523 A | 11/1994 | Chang et al. | |
| 5,541,919 A | 7/1996 | Yong et al. | |
| 5,550,589 A | 8/1996 | Shiojiri et al. | |
| 5,550,593 A | 8/1996 | Nakabayashi | |
| 5,621,840 A | 4/1997 | Kawamura et al. | |

(Continued)

FOREIGN PATENT DOCUMENTS

| | | |
|---|---|---|
| CN | 1272271 | 11/2000 |
| CN | 1273011 | 11/2000 |

(Continued)

OTHER PUBLICATIONS

Hosein P et al: "Dynamic power headroom threshold for mobile rate determination in a CDMA network" Vehicular Technology Conference, 2004. VTC 2004-Spring. 2004 IEEE May 17-19, 2004, pp. 2404-2408, XP010766590.

(Continued)

*Primary Examiner* — Andy Rao
(74) *Attorney, Agent, or Firm* — Timothy F. Loomis; Brent Boyd

(57) ABSTRACT

The disclosure relates to techniques for video source rate control for video telephony (VT) applications. The source video encoding rate may controlled using a dual-buffer based estimation of a frame budget that defines a number of encoding bits available for a frame of the video. The dual-buffer based estimation technique may track the fullness of a physical video buffer and the fullness of the virtual video buffer. The source video encoding rate is then controlled based on the resulting frame budget. The contents of the virtual buffer depend on constraints imposed by a target encoding rate, while the contents of the physical buffer depend on constraints imposed by varying channel conditions. Consideration of physical video buffer fullness permits the video source rate control technique to be channel-adaptive. Consideration of virtual video buffer fullness permits the video source rate control technique to avoid encoding excessive video that could overwhelm the channel.

20 Claims, 6 Drawing Sheets

(56) References Cited

U.S. PATENT DOCUMENTS

| | | | |
|---|---|---|---|
| 5,768,533 A | 6/1998 | Ran | |
| 5,790,538 A | 8/1998 | Sugar | |
| 5,802,068 A | 9/1998 | Kudo | |
| 5,838,678 A | 11/1998 | Davis et al. | |
| 5,969,764 A * | 10/1999 | Sun et al. | 375/240.06 |
| 6,002,802 A | 12/1999 | Chujoh et al. | |
| 6,111,917 A | 8/2000 | Tomita et al. | |
| 6,154,489 A | 11/2000 | Kleider et al. | |
| 6,233,251 B1 | 5/2001 | Kurobe et al. | |
| 6,330,683 B1 | 12/2001 | Jeddeloh | |
| 6,389,034 B1 | 5/2002 | Guo et al. | |
| 6,396,956 B1 * | 5/2002 | Ribas-Corbera et al. | 382/239 |
| 6,404,776 B1 | 6/2002 | Voois et al. | |
| 6,421,387 B1 | 7/2002 | Rhee | |
| 6,487,316 B1 | 11/2002 | Fukunaga et al. | |
| 6,490,243 B1 | 12/2002 | Tanaka et al. | |
| 6,574,247 B1 | 6/2003 | Baggen et al. | |
| 6,587,437 B1 | 7/2003 | Lee et al. | |
| 6,629,318 B1 | 9/2003 | Radha et al. | |
| 6,633,609 B1 | 10/2003 | Ing et al. | |
| 6,694,469 B1 | 2/2004 | Jalali et al. | |
| 6,747,991 B1 | 6/2004 | Hemy et al. | |
| 6,862,298 B1 | 3/2005 | Smith et al. | |
| 6,865,374 B2 | 3/2005 | Kalluri | |
| 6,891,822 B1 | 5/2005 | Gubbi et al. | |
| 7,023,915 B2 | 4/2006 | Pian et al. | |
| 7,051,358 B2 | 5/2006 | Hakenberg et al. | |
| 7,068,086 B2 | 6/2006 | Takeda | |
| 7,193,966 B2 | 3/2007 | Gupta et al. | |
| 7,197,026 B2 | 3/2007 | Chen et al. | |
| 7,206,285 B2 | 4/2007 | Loguinov | |
| 7,269,139 B1 | 9/2007 | Williams, Jr. et al. | |
| 7,304,951 B2 | 12/2007 | Rhee | |
| 7,342,880 B2 | 3/2008 | Yanagihara et al. | |
| 7,342,901 B1 | 3/2008 | Zhang et al. | |
| 7,356,079 B2 | 4/2008 | Laksono et al. | |
| 7,369,497 B2 | 5/2008 | Naruse | |
| 7,369,517 B2 | 5/2008 | Dillinger et al. | |
| 7,453,938 B2 * | 11/2008 | Haskell et al. | 375/240.03 |
| 7,492,710 B2 | 2/2009 | Wadekar et al. | |
| 7,533,192 B2 | 5/2009 | Otsuka et al. | |
| 7,606,427 B2 * | 10/2009 | Malayath et al. | 382/232 |
| 7,668,096 B2 | 2/2010 | Ignatowski et al. | |
| 8,102,878 B2 | 1/2012 | Lee | |
| 8,437,255 B2 | 5/2013 | Jiang | |
| 2002/0007416 A1 | 1/2002 | Putzolu | |
| 2002/0031336 A1 | 3/2002 | Okada et al. | |
| 2002/0054578 A1 | 5/2002 | Zhang et al. | |
| 2002/0154640 A1 | 10/2002 | Wei | |
| 2002/0191544 A1 | 12/2002 | Cheng et al. | |
| 2003/0012212 A1 | 1/2003 | Earnshaw et al. | |
| 2003/0026277 A1 | 2/2003 | Pate et al. | |
| 2003/0202528 A1 | 10/2003 | Eckberg | |
| 2004/0076118 A1 | 4/2004 | Ho et al. | |
| 2004/0240558 A1 | 12/2004 | Hatano et al. | |
| 2004/0252761 A1 | 12/2004 | Brown et al. | |
| 2005/0013244 A1 | 1/2005 | Parlos | |
| 2005/0013245 A1 | 1/2005 | Sreemanthula et al. | |
| 2005/0117056 A1 | 6/2005 | Aprea et al. | |
| 2005/0152320 A1 | 7/2005 | Marinier et al. | |
| 2005/0175093 A1 | 8/2005 | Haskell et al. | |
| 2005/0207392 A1 | 9/2005 | Sivalingham et al. | |
| 2005/0207437 A1 | 9/2005 | Spitzer | |
| 2005/0210515 A1 | 9/2005 | Roh et al. | |
| 2005/0220116 A1 | 10/2005 | Ahn et al. | |
| 2005/0243846 A1 | 11/2005 | Mallila | |
| 2005/0249231 A1 | 11/2005 | Khan | |
| 2005/0259694 A1 | 11/2005 | Garudadri et al. | |
| 2005/0283809 A1 | 12/2005 | Kim | |
| 2006/0007958 A1 | 1/2006 | Kang et al. | |
| 2006/0013263 A1 | 1/2006 | Fellman | |
| 2006/0050743 A1 | 3/2006 | Black et al. | |
| 2006/0072832 A1 | 4/2006 | Nemiroff et al. | |
| 2006/0083243 A1 | 4/2006 | Igarashi et al. | |
| 2006/0256756 A1 | 11/2006 | Wakabayashi | |
| 2007/0019931 A1 | 1/2007 | Sirbu | |
| 2007/0041324 A1 | 2/2007 | Shenoi | |
| 2007/0071030 A1 | 3/2007 | Lee | |
| 2007/0091815 A1 | 4/2007 | Tinnakornsrisuphap et al. | |
| 2007/0091816 A1 | 4/2007 | Lee et al. | |
| 2007/0121706 A1 | 5/2007 | Nakamura et al. | |
| 2007/0201406 A1 | 8/2007 | Yoon et al. | |
| 2007/0291870 A1 | 12/2007 | Ponnekanti | |
| 2008/0056125 A1 | 3/2008 | Kneckt et al. | |
| 2008/0170500 A1 | 7/2008 | Ito et al. | |
| 2008/0205856 A1 | 8/2008 | Kim et al. | |
| 2009/0021572 A1 | 1/2009 | Garudadri et al. | |
| 2009/0034610 A1 | 2/2009 | Lee et al. | |
| 2009/0046743 A1 | 2/2009 | Hamanaka | |
| 2009/0180379 A1 | 7/2009 | Leung et al. | |
| 2010/0215053 A1 | 8/2010 | Chakareski et al. | |

FOREIGN PATENT DOCUMENTS

| | | |
|---|---|---|
| CN | 1293871 | 5/2001 |
| CN | 1674676 A | 9/2005 |
| EP | 1014739 | 6/2000 |
| EP | 1168732 | 1/2002 |
| EP | 1170957 | 1/2002 |
| EP | 1261163 | 11/2002 |
| EP | 1372304 | 12/2003 |
| EP | 1478137 A1 | 11/2004 |
| EP | 1482681 | 12/2004 |
| EP | 1575225 A2 | 9/2005 |
| EP | 1628446 A1 | 2/2006 |
| EP | 1641147 | 3/2006 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001238256 A | 8/2001 |
| JP | 2001517049 A | 10/2001 |
| JP | 2002016929 A | 1/2002 |
| JP | 2002354141 A | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 A | 9/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005192073 A | 7/2005 |
| JP | 2005236783 A | 9/2005 |
| JP | 2005286832 A | 10/2005 |
| JP | 2005303925 A | 10/2005 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 C2 | 12/2003 |
| RU | 2295833 C2 | 3/2007 |
| RU | 2002130511 | 3/2007 |
| WO | WO9823109 A2 | 5/1998 |
| WO | WO9914975 | 3/1999 |
| WO | 0018130 | 3/2000 |
| WO | WO0180477 | 10/2001 |
| WO | WO03001725 A1 | 1/2003 |
| WO | WO03026316 | 3/2003 |
| WO | WO03077462 A1 | 9/2003 |
| WO | 2004056028 | 7/2004 |
| WO | WO2004056123 A1 | 7/2004 |
| WO | 2004084503 | 9/2004 |
| WO | WO2004091130 A1 | 10/2004 |
| WO | WO2005004374 A2 | 1/2005 |
| WO | WO2005039209 A1 | 4/2005 |
| WO | WO2005122025 A2 | 12/2005 |

| | | |
|---|---|---|
| WO | 2007051156 | 5/2007 |
| WO | WO2007119086 | 10/2007 |
| WO | WO2008024890 A2 | 2/2008 |

OTHER PUBLICATIONS

Kalavakunta R et al: "Evolution of mobile broadband access technologies and services consideration and solutions for smooth migration from 2G to 3G networks" Personal Wireless Communications, 2005. IICPWC 2005. 2005 IEEE International Conference on Jan. 23-25, 2005, pp. 144-149, xp010799046.
Myeong-Jin Lee et al.: "Video Frame Rate Control for Non-Guaranteed Network Services with Explicit Rate Feedback," Proceedings of Global Telecommunications Conference, pp. 293-297, 2000, XP002427548.
3GPP2 C.S0024-A: "cdma2000 High rate Packet Data Air Interface Specification."version 1,0, p. 11-143, Mar. 2004.
ITU-T H.263 "Series: H Audiovisual and Multimedia Systems Infrastructure of Audiovisual services—Coding of Moving video—Video Coding for Low Bit Rate Communication," (Jan. 2005).
RFC 2190 C. Zhu et al.: "RTP Payload Format for H.263 Video Streams," Network Working Group, pp. 1-12, Sep. 1997.
RFC 2429 C. Borman et al.: "RTP Payload Format for the 1998 Version of ITU-T Rec. H.263 Video (H.263+)," Network Working Group, pp. 1-17, Oct. 1998.
RFC 3016 Y. Kikuchi et al.: "RTP Payload Format for MPEG-4 Audio/Visual Streams," Network Working Group, pp. 1-21, Nov. 2000.
Written Opinon—PCT/US2006/060289, International Search Authority—European Patent Office—Sep. 7, 2007.
International Preliminary Report on Patentability—PCT/US2006/060289, International Search Authority—The International Bureau of WIPO—Geneva—Switzerland, Apr. 29, 2008.
"Video Codec Test Model, Near-Term, Version 8 (TMN8) Revision 1," ITU-T Telecommunication Standardization Sector of ITU, Geneva, CH, vol. Q.15/16, Sep. 8, 1997, pp. I-III.
Reininger D et al., "VBR MPEG Video Coding with Dynamic Bandwidth Renegotiation," Communications—Gateway to Globalization. Proceedings of the Conference on Communications. Seattle, Jun. 18-22, 1995, ICC, New York, IEEE, US, vol. 3, Jun. 18, 1995, pp. 1773-1777.
Zhihai He et al., "A Linear Source Model and a Unified Rate Control Algorithm for DCT Video Coding," IEEE Transactions on Circuits and Systems for Video Technology, IEE Service Center, Piscataway, NJ, US, vol. 12, No. 11, Nov. 2002, pp. 970-982.
Zhihai He et al., "Optimum Bit Allocation and Accurate Rate Control for Video Coding via rho-Domain Source Modeling," IEEE Transactions on Circuits and Systems for Video Technology, IEEE Service Center, Piscataway, NJ, US, vol. 12, No. 10, Oct. 2002, pp. 840-849.
Kamel I et al., "A Study on Scheduling Multiple Priority Requests in Multimedia Servers," Multimedia Computing and Systems, 1999. IEEE International Conference on Florence, Italy Jun. 7-11, 1999, Los Alamitos, CA, USA, IEEE Comput. Soc, US, vol. 2, Jun. 7, 1999, pp. 395-399.
Fidler M, "Real-time Multimedia Streams in a Differentiated Services Network," Computer Communications and Networks, 2001. Proceedings Tenth International Conference on Oct. 15-17, 2001, Piscataway, NJ, USA, IEEE, Oct. 15, 2001, pp. 380-385.
Lakshman T et al., "The Drop from Front Strategy in TCP and in TCP over ATM," Proceedings of IEEE Infocom 1996. Conference on Computer Communications. Fifteenth Annual Joint Conference of the IEEE Computer and Communications Societies. Networking the Next Generation. San Francisco, Mar. 24-29, 1996, Proceedings of Infocom, vol. 3 Conf. 15, Mar. 24, 1996, pp. 1242-1250.
Keller R et al., "An Active Router Architecture for Multicast Video Distribution," Infocom 2000. Nineteenth Annual Joint Conference of the IEEE Computer and Communications Societies. Proceedings IEEE Tel Aviv, Israel Mar. 26-30, 2000, Piscataway, NJ, USA, IEEE, US, vol. 3, Mar. 26, 2000, pp. 1137-1146.
Meng-Huang Lee et al., "A Predictable High-Throughput File System for Video Conference Recording," Systems, Man and Cybernetics, 1995. Intelligent Systems for the 21st Century, IEEE International Conference on Vancouver, BC, Canada Oct. 22-25, 1995, New York, NY, USA, IEEE, US, vol. 5, Oct. 22, 1995, pp. 4296-4301.
PCT Search Report, Sep. 7, 2006.
3GPP TR 26.902 V1.0.0, "3RD Generation Partnership Project; Technical Specification Group Services and System Aspects; Video Codec Performance," (Release 7)(Mar. 2007).
3GPP TR 26.914, "Multimedia telphony over IP Multimedia Subsystem (IMS); Optimization opportunities" 2006.
3GPP TS 26.114 v1.2.0 (Dec. 13, 2006), "3rd Generation Partnership Project; Technical Specification Group Services and System Aspects—IP multimedia subsystem (IMS) multimedia telephony; media handling and interaction," (Release 7) TSG-SA4 internal working draft.
3GPP TS 34.108 v6.5.0, "3rd Generation Partnership Project; Technical Specification Group Radio Access Network Common test environment for UE conformance testing," (Release 6) (Dec. 2006).
3GPP2 C.R1008 v1.0, "cdma2000 Multimedia evaluation methodologies," Jan. 12, 2007.
3GPP2: "Packet Switched Video Telephony Services (PSVT/MCS)" 3GPP2, C.S0055-0, Version 1.0, Dec. 2007, XP002542622 p. 32, paragraph 8—p. 33.
D. Morikawa et al.: A feedback rate control of video stream in best-effort high-speed mobile packet network, The 5th Int. Symp. Wireless Personal Multimedia Comm., Oct. 27-30, 2002.
D. Singer et al., "A general mechanism for RTP Header Extensions," RFC 5285, IETF Internet Draft (Jul. 2008).
G.Cheung et al., "Video transport over wireless networks," IEEE Trans. Multimedia, Aug. 2005 , pp. 777-785.
H. Schulzrinne et al.,"RTP: A Transport Protocol for Real-Time Applications," IETF RFC 3550 (2003).
Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.
Harinath Garudadri et al.: "Rate Adaptation for Video Telephony in 3G Networks" Nov. 12-13, 2007, pp. 342-348.
I. Johansson et al., "Support for non-compound RTCP in RTCP AVPF profile, opportunities and consequences," IETF Internet Draft Dec. 20, 2006; Expires Jun. 23, 2007.
ISO/IEC 14496-2, International Standard, Information technology—Coding of audio-visual objects—Part 2: Visual, Third edition Jun. 1, 2004.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.
"ITU-T Study Group 16, rate control for low-delay video communications," No. q15-A-20, 1997.
Kueh V Y H et al.: "Performance evaluation of SIP-based session establishment over satellite-UMTS" VTC 2003-Spring. The 57th IEEE Semiannual Vehicular Technology Conference Proceedings. Apr. 22-25, 2003, vol. 2, Apr. 22, 2003, pp. 1381-1385, XP010862.
Lee M et al: "Video Frame Rate Control For Non-Guaranteed Network Services With Explicit Rate Feedback" IEEE Telecommunication Conference, Nov. 27- Dec. 1, 2000; vol. 1, Nov. 27, 2000, pp. 293-297, XP001195580.
Lei Z et al.: "Adaptive video transcoding and streaming over wireless channels" Journal of Systems & Software, vol. 75, No. 3, Mar. 1, 2005, pp. 253-270, XP004656968.
Lu, X; et. al: "Understanding video quality and its use in feedback control" Packet Video 2002, Pittsburgh,PA USA 2002.
Masoud Khansari et al: "Low Bit-Rate Video Transmission over Fading Channels for Wireless Microcellular Systems", IEEE Transactions on Circuits and Systems for Video Technology, IEEE Service Center, Piscataway, NJ, US, vol. 6, No. 1, Feb. 1, 1996, XP011014283, ISSN: 1051-8215.
Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6—p. 41.

Ruiz, P. et el.: "Adaptive Multimedia Applications to Improve User-perceived QoS in Multihop Wireless Al hoc Networks," Proceedings of the IEEE Int-rnation-1 Conference on Wireless Lane and Horne Networks (1CWLHN 2002) 0nline] Aug. 2002, pp. 673-684, XP002466712.

Technical Specification Group Radio Access Network: "3GPP TR25. 848 V4.0.0 Physical Layer Aspects of UTRA High Speed Downlink Packet Access (Release 4)" 3GPP TR 25.848 V4.0.0, Mar. 2001, pp. 1-89, XP002189517.

Translation of Korean application 2008-7029470 corresponding to U.S. Appl. No. 11/445,099, citing KR2005-45667 (KR pub KR20060046281) dated Apr. 30, 2010 (060767KR).

T.V. Lakshman et al.: "Transporting compressed video over ATM networks with explicit-rate feedback control," IEEE Trans. Networking, Oct. 1999, vol. 7, No. 5, pp. 710-723.

T.V. Lakshman et al.: "VBR Video: Tradeoffs and Potentials", Proceeding of the IEEE, May 1998, vol. 86, No. 5, pp. 952-973.

"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.

Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.

International Search Report—PCT/US2006/060289—International Search Authority, European Patent Office, Sep. 7, 2007.

Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.

"TIA/EIA/IS-856 CDMA2000 High Rate Packet Data Air Interface Specification," Apr. 2004.

3GPP S4-060613 "MTSI Dynamic Video Rate Adaptation", Nov. 2006, pp. 1-9.

3GPP TS 26.234 v7.1.0 (Dec. 2006), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.

Kang, K., et al., "Dynamic Rate Control Mechanism for Large Scale Sessions," Twelfth International Conference on Information Networking Proceedings, 1998. (ICOIN-12). Tokyo, Japan, Jan. 21-23, 1998, (Jan. 21, 1998), pp. 21-24, XP010265270, ISBN: 978-0-8186-7225-5., doi: 10.1109/ICOIN.1998.648346.

Stockhammer, Thomas. "Progressive Video Transmission for Packet Lossy Channels Exploiting Feedback and Unequal Erasure Protection," International Conference on Image Processing (ICIP), vol. 2, (Sep. 22, 2002), pp. 169-172, XP010607935, ISBN: 978-0-7803-7622-9.

Qun-Hua, Wang et al., "The Application of a Simple TCP-friendly Congestion/Rate Control Arithmetic on Multimedia Teaching System", Computer and Information Technology, Apr. 30, 2007, pp. 28-30, vol. 15 No. 2.

"Simulation Results for MTSI Dynamic Video Adaptation Signalling", 3GPP TSG-SA WG4 #42 S4-070056, Jan. 29, 2007, pp. 1-12.

\* cited by examiner

VIDEO SOURCE RATE CONTROL FOR VIDEO TELEPHONY

This application claims the benefit of U.S. provisional Application No. 60/731,614, filed Oct. 27, 2005.

TECHNICAL FIELD

The disclosure relates to video telephony (VT) and, more particularly, techniques for video source rate control in a VT system.

BACKGROUND

Video telephony (VT) involves the real-time communication of packets carrying audio and video data. A VT device includes a video encoder that obtains video from a video capture device, such as a video camera or video archive, and generates video packets. Similarly, an audio encoder in a VT device obtains audio from an audio capture device, such as a microphone or speech synthesizer, and generates audio packets. The video packets and audio packets are placed in a radio link protocol (RLP) queue. A medium access control (MAC) layer module generates medium access control (MAC) layer packets from the contents of the RLP queue. The MAC layer packets are converted to physical (PHY) layer packets for transmission across a communication channel to another VT device.

In mobile VT applications, a VT device receives the physical layer packets via a wireless forward link (FL) (or "downlink") from a base station to the VT device as a wireless terminal. A VT device transmits the PHY layer packets via a wireless reverse link (RL) (or "uplink") to a base station. Each VT device includes PHY and MAC layers to convert the received PHY and MAC layer packets and reassemble the packet payloads into audio packets and video packets. A video decoder within the VT device decodes the video data for presentation to a user via a display device. An audio decoder within the VT device decodes the audio data for output via an audio speaker.

Mobile VT in a wireless environment can be challenging. The data rate over the wireless channel is limited and varies with time. For example, in a CDMA2000 1x EV-DO Release 0 network, the data rate may vary due to channel conditions within a wireless coverage area or traffic congestion among multiple VT users. In addition, when the data rate drops to zero, e.g., when there is no data to send, recovery to a reasonable data rate may require time. As a result, mobile VT can be susceptible to undesirable video and audio delay, which undermines the ability to carry on smooth video conferencing in real-time.

SUMMARY

In general, the disclosure is directed to techniques for video source rate control for VT applications. Channel conditions, excessive video content, or both can cause significant delays in transmission of video. When reverse link (RL) throughput is reduced, for example, video can overwhelm the RL and increase video transmission delay. The disclosure provides techniques for controlling the encoding rate of source video to reduce video delay over a range of channel conditions. In this sense, the video source rate control technique may be channel-adaptive. The techniques may be effective in reducing degradation of spatial and temporal quality when the video source encoding rate is reduced due to channel conditions or excessive video content or complexity.

In some embodiments, the source video encoding rate is controlled using a dual-buffer based estimation of a frame budget that defines a number of encoding bits available for a frame of the video. The dual-buffer based estimation technique may track the fullness of a physical video buffer and the fullness of the virtual video buffer relative to a threshold. The source video encoding rate is then controlled based on the resulting frame budget. The contents of the virtual video buffer depend on bit constraints imposed by a target encoding rate, while the contents of the physical video buffer depend on channel constraints imposed by varying channel conditions, e.g., RL throughput.

Consideration of physical video buffer fullness permits the video source rate control technique to be channel-adaptive. The amount of encoded video in the physical video buffer is, at least in part, a function of the rate at which the channel can accommodate additional video packets. Consideration of virtual video buffer fullness permits the video source rate control technique to avoid encoding excessive video that could overwhelm the channel.

The video source rate control technique may be used in conjunction with a channel-adaptive video packet shaping technique that controls the sizes of video packets extracted from the physical video buffer based on channel conditions. Channel conditions influence the amount of video removed from the physical video buffer, which provides an indirect indication of channel conditions for use in formulating the frame budget. Once a frame budget is established, a video block budget also may be estimated in the rho domain to allocate a portion of the frame budget to individual video blocks within each frame.

In one embodiment, the disclosure provides a method comprising adding encoded video to a physical video buffer, removing a packet of the encoded video from the physical video buffer for transmission over a channel, maintaining a virtual video buffer representing an amount of the encoded video relative to a target encoding rate, and controlling an actual encoding rate of the video based on fullness of the physical video buffer and fullness of the virtual video buffer.

The disclosure also contemplates a computer-readable medium comprising instructions to cause one or more processors to perform such a method. For example, the disclosure also provides a computer-readable medium comprising instructions to cause one or more processors to add encoded video to a physical video buffer, remove a packet of the encoded video from the physical video buffer for transmission over a channel, maintain a virtual video buffer representing an amount of the encoded video relative to a target encoding rate, and control an actual encoding rate of the video based on fullness of the physical video buffer and fullness of the virtual video buffer.

In another embodiment, the disclosure provides a system comprising a video encoder, a physical video buffer that stores video encoded by the video encoder, a packet shaper that removes the encoded video from the physical video buffer for transmission over a channel, a virtual video buffer representing an amount of the encoded video relative to a target encoding rate, and a controller that controls an actual encoding rate of the video based on fullness of the physical video buffer and fullness of the virtual video buffer.

The details of one or more embodiments are set forth in the accompanying drawings and the description below. Other features, objects, and advantages will be apparent from the description and drawings, and from the claims.

DETAILED DESCRIPTION

Figure 1:
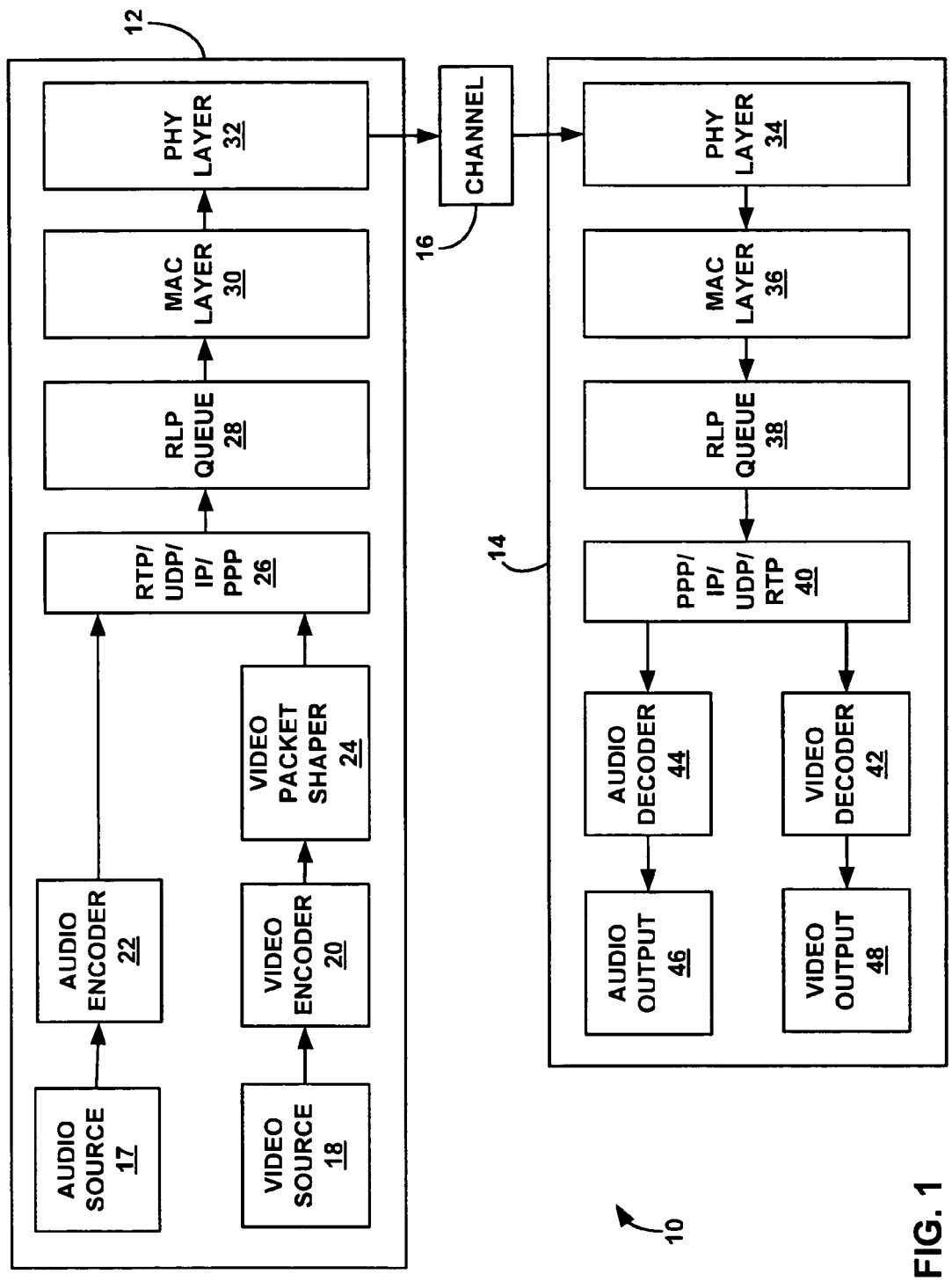
FIG. 1 is a block diagram illustrating an audio/video encoding and decoding system for VT applications.

FIG. 1 is a block diagram illustrating a video encoding and decoding system 10. As shown in FIG. 1, system 10 includes an encoder system 12 and a decoder system 14 connected by a transmission channel 16. In the example of FIG. 1, encoder system 12 is associated with a first video communication device and includes an audio source 17, video source 18, video encoder 20, audio encoder 22, video packet shaper 24, real-time transport protocol (RTP)/user datagram protocol (UDP)/Internet protocol (IP)/point-to-point protocol (PPP) conversion module 26, radio link protocol (RLP) queue 28, MAC layer module 30 and physical (PHY) layer module 32. Decoder system 14 is associated with another video communication device and includes a PHY layer module 34, MAC layer module 36, RLP queue 38, RTP/UDP/IP/PPP conversion module 40, video decoder 42, audio decoder 44, audio output device 46 and video output device 48.

As will be described, video encoder 20 provides channel-adaptive video source rate control to reduce video delay under variable channel throughput conditions, such as those existing, e.g., in a CDMA2000 1x EV-DO Release 0 network. Reverse link (RL) throughput is a key factor in video delay within an EV-DO, Release 0 network. Video encoder 20 may control the video source encoding rate, at least in part, as a function of RL throughput. Video encoder 20 may be useful in an environment having low end-to-end delay requirements, e.g., less than 500 milliseconds. End-to-end delay refers to delay in transmission of video between a sender and a recipient, e.g., in a mobile wireless VT system. Channel-adaptive source rate control, as described in this disclosure, may adaptively control end-to-end delay of video transmission while making a trade-off between spatial and temporal visual quality when operating with either constant bit rate (CBR) or variable bit rate (VBR) transmission channels, such as wireless channels.

Video encoder 20 may be effective in reducing degradation of spatial and temporal quality when the video source encoding rate is reduced due to channel conditions or excessive video content or complexity. Existing rate control schemes do not support desirable end-to-end delay with a reasonable trade-off between spatial and temporal video quality. The use of a small, fixed video buffer size, for example, can result in a large percentage of skipped frames, causing jerky motion and low spatial visual quality. Conversely, the use of a large video buffer size can produce better spatial quality, but tends to result in a larger, variable delay that can be disconcerting and annoying to an end user.

In general, the performance of video source encoding rate control can be evaluated by reference to end-to-end delay, which includes buffering and transmission delays, spatial visual quality, number of skipped video frames, encoder buffer underflow, which indicates bandwidth underutilization, encoder buffer overflow, which causes frame skipping, decoder buffer underflow, which indicates there is no data to decode and less display refresh, decoder buffer overflow, which indicates lost data, receiver display refresh rate, audio-video synchronization, encoder-side peak signal to noise ratio (PSNR), and initial buffer delay following a first intra (I) frame Video encoder 20, in accordance with this disclosure, may employ a dual-buffer based scheme for estimation of a frame budget that defines a number of encoding bits available for a frame of the video. The dual-buffer based estimation technique may track the fullness of a physical video buffer and the fullness of a virtual video buffer relative to a threshold. The source video encoding rate is then controlled based on the resulting frame budget. The contents of the virtual video buffer depend on bit constraints imposed by a target encoding rate, while the contents of the physical video buffer depend on channel constraints imposed by varying channel conditions, e.g., reverse link (RL) throughput. In this manner, video encoder 20 may be capable of supporting a specified target encoding rate, and a specified end-to-end delay, with low frame skipping and good spatial quality.

In some embodiments, video encoder 20 may work in conjunction with a video packet shaper 24 that performs video packet shaping based on channel conditions. For example, video packet shaper 24 may packetize video with packet sizes based at least in part on channel conditions. In some embodiments, video packet shaper may prioritize audio packet transmission over video packet transmission in order to avoid excessive audio delays. Video packet shaper 24 may control the size of video packets and the rate at which video packets are removed from a physical video buffer for transmission over channel 16.

In turn, the size and rate of the video packets influences the fullness of the physical video buffer. For poor channel conditions, the sizes of video packets and the rate at video packets are generated may be reduced by video packet shaper 24 to avoid overwhelming the RL. For better channel conditions, the sizes of video packets and the rate at which video packets are generated may be increased by video packet shaper 24. Video encoder 20 monitors the physical video buffer fullness, in conjunction with virtual video buffer fullness, to adaptively control encoding rate according to channel conditions and bit constraints.

System 10 may provide bi-directional video and audio transmission, e.g., for video telephony via transmission channel 16. Accordingly, generally reciprocal encoding, decoding, and conversion modules may be provided on opposite ends of channel 16. In some embodiments, encoder system 12 and decoder system 14 may be embodied within video communication devices such as wireless mobile terminals equipped for video streaming, video telephony, or both. The mobile terminals may support VT according to packet-switched standards such as RTP, UDP, IP, or PPP.

RTP/UDP/IP/PPP conversion module adds appropriate RTP/UDP/IP/PPP header data to audio and video data received from audio encoder 22 and video packet shaper 24, and places the data in RLP queue 28. RTP runs on top of UDP, while UDP runs on top of IP, and IP runs on top of PPP. MAC layer module 30 generates MAC RLP packets from the contents of RLP queue 28. PHY layer module 32 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel

16 to MAC RLP packets. MAC layer module 36 places the MAC RLP packets into RLP queue 38. RTP/UDP/IP/PPP conversion module 40 strips the header information from the data in RLP queue 38, and reassembles the video and audio data for delivery to video decoder 42 and audio decoder 44, respectively.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. Typically, for VT applications, system 10 will be designed to support high data rate (HDR) technologies such as cdma2000 1x EV-DO, Release 0, or subsequent EV-DO releases.

Video encoder 20 generates encoded video data according to a video compression method, such as MPEG-4. Other video compression methods may be used, such as the International Telecommunication Union (ITU) H.263, ITU H.264, or MPEG-2 methods. Audio encoder 22 encodes audio data to accompany the video data. Video source 18 may be a video capture device, such as one or more video cameras, one or more video archives, or a combination of video cameras and video archives.

The audio data may be encoded according to an audio compression method, such as adaptive multi-rate narrow band (AMR-NB), or other techniques. The audio source 17 may be an audio capture device, such as a microphone, or a speech synthesizer device. For VT applications, the video will permit viewing of a party to a VT conference and the audio will permit the speaking voice of that party to be heard.

In operation, RTP/UDP/IP/PPP conversion module 26 obtains video and audio data packets from video encoder 20 and audio encoder 22. As mentioned previously, RTP/UDP/IP/PPP conversion module 26 adds appropriate header information to the audio packets and inserts the resulting data within RLP queue 28. Likewise, RTP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/UDP/IP/PPP header information and audio or video packet data that is contained within RLP queue 28.

Audio packets are inserted into RLP queue 28 independently of video packets. However, packet shaper 24 controls the sizes of video packets added to RLP queue 28 so that each audio packet can be carried by the next available MAC layer packet. In some cases, a MAC layer packet generated from the contents of RLP queue 28 will carry only header information and video packet data. In other cases, the MAC layer packet will carry only header information and audio packet data.

In many cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 converts the MAC RLP audio-video packets into PHY layer packets for transmission across channel 16.

Channel 16 carries the PHY layer packets to decoder system 14. Channel 16 may be any physical connection between encoder system 12 and decoder system 14. For example, channel 16 may be a wired connection, such as a local or wide-area wired network. Alternatively, as described herein, channel 16 may be a wireless connection such as a cellular, satellite or optical connection. Channel conditions may be a concern for wired and wireless channels, but is especially problematic for mobile VT applications performed over a wireless channel 16, in which channel conditions may suffer due to fading or congestion.

In accordance with this disclosure, video encoder 20 encodes video from video source 18, and adds the encoded video to a physical video buffer. Video packet shaper 24 packetizes video content within the physical video buffer, and removes packets of the encoded video from the physical video buffer for transmission over channel 16. The rate at which video packet shaper 24 removes video packets from the physical video buffer, as well as the size of the packets, depends in part on channel conditions associated with channel 16. For example, channel 16 may be characterized by a reverse link (RL) having a throughput that varies according to channel conditions.

Video encoder 20 maintains a virtual video buffer representing an amount of the encoded video relative to a target encoding rate. The target encoding rate may be a maximum encoding rate specified for video packets transmitted over channel 16. Video encoder 20 controls an actual encoding rate of the video from video source 18 based on fullness of the physical video buffer and fullness of the virtual video buffer. Consideration of physical video buffer fullness permits the video source rate control applied by video encoder 20 to be channel-adaptive. The amount of video in the physical video buffer is, in part, a function of the rate at which the channel can accommodate additional video packets. Consideration of virtual video buffer fullness permits the video source rate control technique applied by video encoder 20 to avoid encoding excessive video that could overwhelm the channel, given a maximum target encoding rate.

Video packet shaper 24 controls the size of each video packet provided to RTP/UDP/IP/PPP conversion module 26. Video packet shaper 24 may be any packetizer that packetizes video in the physical video buffer and removes the video packets for transmission over channel 16. In some embodiments, however, the video source rate control technique may be used in conjunction with a channel-adaptive video packet shaping technique that controls the sizes of video packets extracted from the physical video buffer based in part on channel conditions, and prioritizes transmission of audio packets from audio encoder 22.

For example, video packet shaper 24 may size video packets so that each audio packet can be accommodated by the next available MAC layer packet. Controlled sizing of video packets prevents audio delays caused by channel conditions, large video packets, or both. When an audio packet is available, it is placed in the RLP queue for inclusion in the next available MAC RLP packet generated by MAC layer module 30. The audio packet may be combined with a video packet that has been sized to permit space for placement of the audio packet within the MAC RLP packet. By prioritizing audio, the audio portion of a VT conference can be conveyed without substantial delay, even though the video portion may suffer from delay due to channel conditions. Although video may be compromised by channel conditions, video packet shaper 24 prioritizes audio to ensure that the parties to the VT conference are still able to smoothly carry on a verbal conversation.

Video packet shaper 24 may be configured to be channel-adaptive in the sense that it is capable of adjusting video packet size based on channel conditions. In this manner, encoder system 12 can prioritize transmission of audio packets to avoid audio delays when channel conditions are poor. At the same time, video packet shaper 24 can ensure that audio prioritization does not result in video packets being under-packetized. In other words, video packet shaper 24 sizes video packets sufficiently small to permit inclusion of one or more audio packets in the next available MAC RLP packet, but not so small that excessive space in the MAC RLP packet is wasted. Consequently, video packet shaper 24 may support both prioritization of audio packets and efficient transmission of video packets. When channel adaptive video packet shaping is applied, the higher priority given to audio data can come at the cost of increased video delay. Video delay increases when the reverse link (RL) throughput is reduced. To avoid excessive video delay, in accordance with this disclosure, the video source rate is controlled as a function of channel throughput.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/UDP/IP/PPP module 40 removes the accompanying header information and provides video packets to video decoder 42 and audio packets to audio decoder 44. Video decoder 42 decodes the video data frames to produce a stream of video data for use in driving a display device. Audio decoder 44 decodes the audio data to produce audio information for presentation to a user, e.g., via an audio speaker.

As discussed above, video packet shaper 24 controls the size of video packets submitted to RTP/UDP/IP/PPP conversion module 26. Specifically, video packet shaper 24 may be configured to control the size of video packets in order to prioritize transmission of audio packets in MAC RLP packets, and prevent video packets from overwhelming RLP queue 28. In this manner, the audio portion of a VT conference can be conveyed without substantial delay, even though the video portion may suffer from delay due to channel conditions. Although video may be compromised by channel conditions, video packet shaper 24 ensures that the parties to the VT conference are still able to smoothly carry on a verbal conversation.

The packet shaping technique applied by video packet shaper 24 may apply one or more rules to ensure prioritized transmission of audio packets. According to one rule, for example, an audio packet should be sent in the very next available MAC RLP packet generated from the contents of RLP queue 28. Audio frames are generated by audio encoder 22 at first periodic intervals. MAC RLP packets are generated by MAC layer module 30 at second periodic intervals. The audio frame generated at a given interval should be placed in the next available MAC RLP packet generated by MAC layer module 30. In some embodiments, as an option, the total output queue size of RLP queue 28 along with the audio packet size should be able to be carried in one MAC RLP packet.

Various rules may be applied with respect to every packet of a VT sequence. Although some video packets may be inherently sized in a manner that ensures that audio and video can be carried in a single MAC RLP packet, others video packets may be larger and require size reduction in order to ensure that audio and video can be carried in a single MAC RLP packet, particularly when channel conditions degrade. By applying the techniques with respect to every packet of a VT sequence, satisfactory speech communication can be ensured even if the content of the video is expansive or channel bandwidth is substantially limited.

Video packet shaper 24 controls the size of each video packet submitted to RTP/UDP/IP/PPP conversion module 26 for insertion in RLP queue 28. Video packet shaper 24 may ensure that audio packets are not delayed due to consumption of successive MAC RLP packets by expansive video content. Instead, when audio is available, video from video encoder 20 is divided into packets with sizes selected to permit each MAC RLP packet to carry audio and video. Each audio frame may be used as the audio packet provided to RLP queue 28. Alternatively, in some embodiments, an audio packet may bundle multiple audio frames provided at successive intervals.

Video packet shaper 24 may determine the video packet size for each MAC layer packet, in some embodiments, based on an estimated channel throughput for the MAC layer packets generated between successive audio frames. The throughput may be estimated based on channel conditions, as represented by one or more of current wireless channel transmit rate, wireless base station activity, and transmit power limitations. For example, the channel conditions may be determined based on current MAC layer data rate, a reverse activity (RA) bit, and a power amplifier (PA) limit. In accordance with this disclosure, video encoder 20 applies adaptive source rate control based in part on physical video buffer fullness. In this case, the source video encoding rate may be reduced by video encoder 20 if the channel conditions do not support the video encoding rate.

Figure 2:
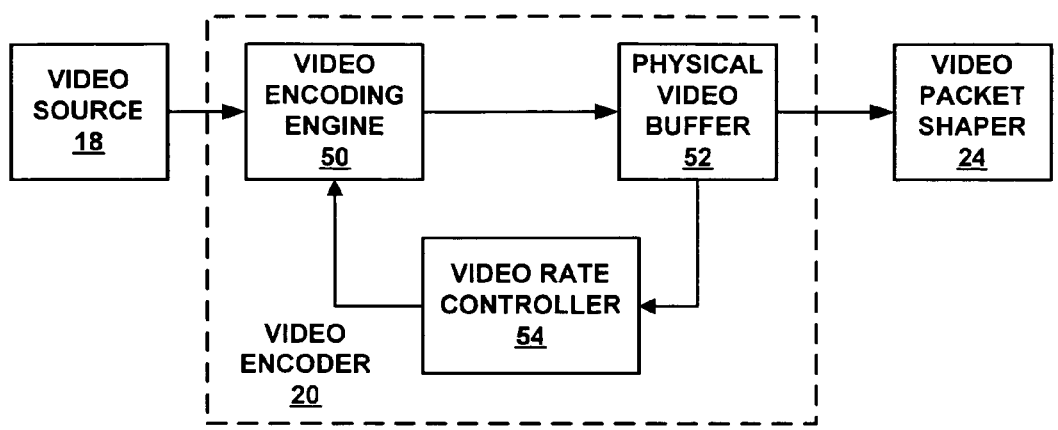
FIG. 2 is a block diagram illustrating a video encoding system implementing video source rate control.

FIG. 2 is a block diagram illustrating video encoding system 10 implementing video source rate control. As shown in FIG. 2, video encoder 20 includes a video encoding engine 50, physical video buffer 52 and video rate controller 54. Video encoding engine 50 obtains video data from video source 18 and encodes the video data at a rate controlled by video rate controller 54. Video encoding engine 50 then places the encoded video in physical video buffer 52. Video packet shaper 24 removes video data from video buffer 52 and packetizes the video data for transmission over channel 16. The size of the video packets may be, in part, a function of channel conditions on channel 16, such as RL throughput. Video rate controller 54 monitors the fullness of physical video buffer 52 and controls the video encoding rate applied by video encoding engine 50, at least in part, based on the fullness.

The encoding rate may be updated on a frame-by-frame basis according to the current fullness of physical video buffer 52. In addition, as will be described, video rate controller 54 may maintain a virtual video buffer. In this manner, video rate controller 54 may control the source video encoding rate using a dual-buffer based estimation of a frame budget that defines a number of encoding bits available for a frame of the video. The dual-buffer based estimation technique tracks the fullness of physical video buffer 52 and the fullness of the virtual video buffer relative to a threshold. Video rate controller 54 then controls the source video encoding rate based on the resulting frame budget.

The contents of the virtual video buffer depend on bit constraints imposed by a target encoding rate, while the contents of physical video buffer 52 depend on channel constraints imposed by varying channel conditions, e.g., RL throughput. The size of the virtual video buffer may be scaled according to RL throughput. Consideration of the fullness of physical video buffer 52 permits the video source rate control technique to be channel-adaptive. The amount of video in the physical video buffer 52 is, in part, a function of the rate at which channel 16 can accommodate additional video packets. Consideration of virtual video buffer fullness permits the video rate controller 54 to avoid encoding excessive video that could overwhelm channel 16. The fullness of the virtual video buffer may be a function of a target encoding rate, e.g., including a target bit rate and a target frame rate. In effect, the virtual video buffer may be used to control frame bit allocation and/or frame skipping.

Video encoder 20 may provide a number of desirable features. For example, video encoder 20 may provide a video source rate control scheme that is generally CODEC-independent. For example, video encoder 20 may be adapted for video encoding according to MPEG4, ITU H.263 or ITU H.264. In addition, video encoder 20 may be susceptible to simple implementation within a DSP or embedded logic core. In some embodiments, video encoder 20 may apply model-based rate control, e.g., applying video block rate control in the rho domain. For example, once a frame bit budget is established for a particular video frame, the frame bit budget may be allocated among the video blocks, e.g., macroblocks (MBs), within the frame using rho domain rate control. The rho domain values for individual MBs can then be mapped to quantization parameter (QP) values.

Figure 3:
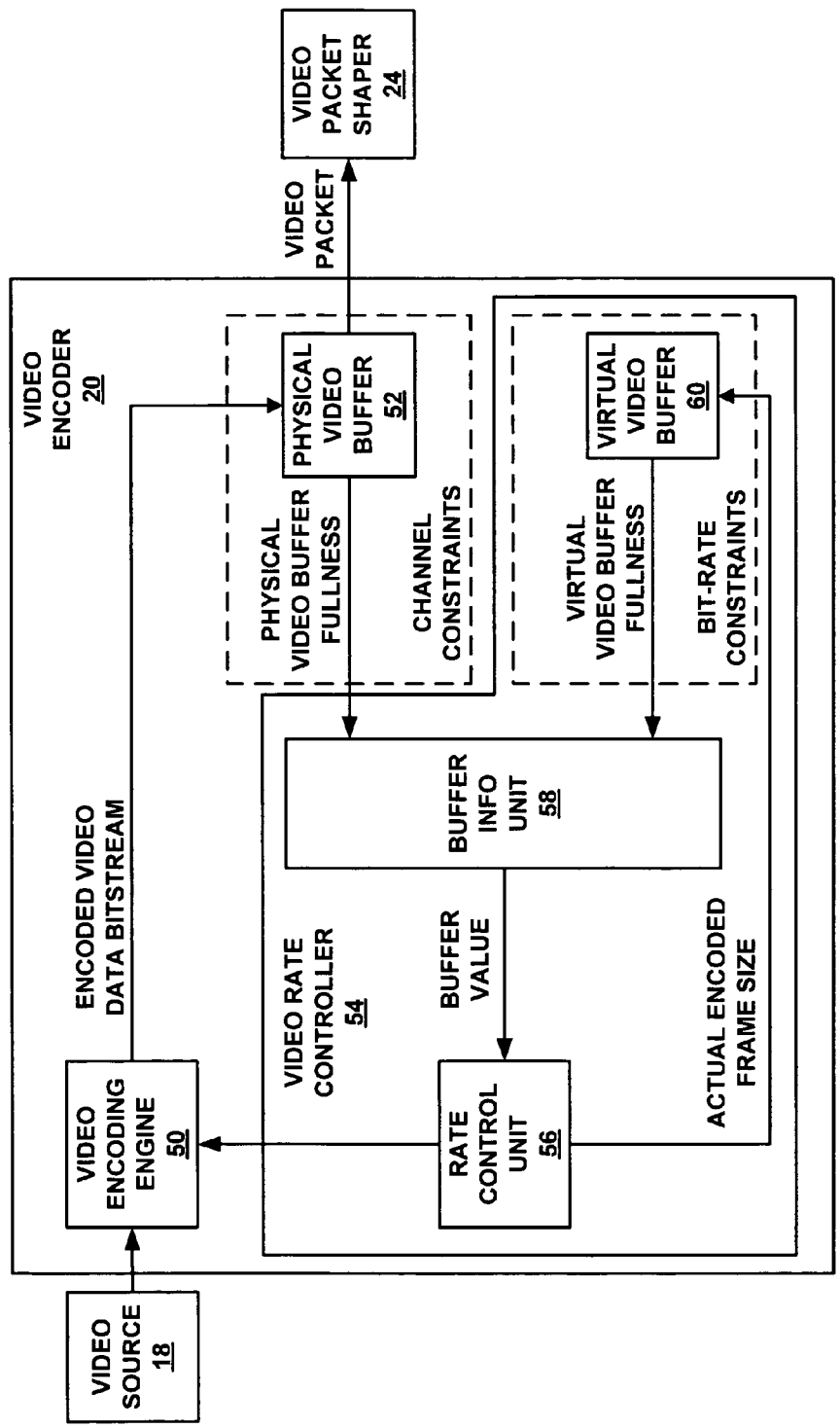
FIG. 3 is a block diagram illustrating an exemplary embodiment of the video encoding system of FIG. 2 with video source rate control using dual-buffer based frame budget estimation.

FIG. 3 is a block diagram illustrating an exemplary embodiment of video encoding system 10 of FIG. 2, with video source rate control using dual-buffer based frame budget estimation. As shown in FIG. 3, video encoding engine 50 obtains video from video source 18 and generates an encoded video data bitstream, e.g., according to MPEG4 or other encoding techniques. The encoded video is placed in physical video buffer 52. In the example of FIG. 3, video rate controller 54 includes a rate control unit 56, buffer information unit 58 and virtual video buffer 60. Buffer information unit 58 monitors fullness of physical video buffer 52, which is a function of the size of video packets removed from the physical video buffer by video packet shaper 24. The size of the video packets is, in turn, a function of channel constraints such as RL throughput. In addition, buffer information unit 58 monitors the fullness of virtual video buffer 60, which is a function of the amount of video encoded by video encoder 20, and bit-rate constraints such as a target encoding rate, including target bit rate and target frame rate.

Based on the fullness of physical video buffer 52 and the fullness of virtual video buffer 60, buffer information unit 58 generates a buffer value for analysis by rate control unit 56. In some embodiments, buffer information unit 58 may generate a maximum of the physical video buffer fullness and virtual video buffer fullness as the buffer value provided to rate control unit 56. The physical video buffer fullness or virtual video buffer fullness may be weighted by a coefficient to prioritize physical video buffer 52 over virtual video buffer 60, or vice versa. Rate control unit 56 may first compare the buffer value received from buffer information unit 58 to a skipping threshold Tskip.

If the buffer value meets or exceeds the skipping threshold Tskip, rate control unit 56 instructs video encoding engine 50 to skip encoding of the next video frame. In this case, there is no need to determine a frame budget because the next frame will not be encoded. If the buffer value is less than the skipping threshold Tskip, then rate control unit 56 determines a frame budget to be used by video encoding engine 50 to encode the next frame. The frame budget defines the number of encoding bits allocated for encoding the next video frame.

In addition to estimating a frame bit budget, i.e., the number of bits for an entire frame, rate control unit 56 also may estimate a video block budget. The video block budget defines the number of encoding bits to be allocated to each video block, e.g., macroblock (MB), within a frame. The frame budget may be evenly allocated over the video blocks, or allocated based on a video block budget scheme. For example, the video block budget may apply an MB-level parametric rho-domain mapping of a frame and an MB bit budget to quantization parameters (QP) for each MB. In some embodiments, each MB QP may be post-processed to maintain a uniform intra-frame spatial quality. QPs of possible skipped MBs may be considered in order to produce a compliant MPEG-4 bitstream.

In some embodiments, physical video buffer 52 may be configured to drop video data if it resides within the buffer for a period of time that exceeds a threshold. For example, after a particular frame of video data has been placed in video buffer 52 by video encoding engine 50, it may remain in the physical video buffer for an extended period of time due to poor channel conditions. In this case, although more encoded video may be available from video encoding engine 50, there may be no available space in physical video buffer 52. To accommodate the newly encoded data, physical video buffer 52 may be configured to drop the oldest video data, e.g., on a first-in-first-dropped basis. Dropping the video data may simply involve discarding the video data and overwriting the buffer space previously occupied by the video data with newly encoded video data. The dropped data may be a frame of data or some predetermined amount of data, e.g., measured in bytes.

The video data may be dropped when it has been in physical video buffer 52 for a period of time that exceeds the threshold. Alternatively, criteria for dropping the video data from physical video buffer 52 may include both a time that exceeds the threshold and an indication from encoding engine 50 that additional video data is being encoded, which demands space within the physical video buffer. In either case, at least a portion of the video data in physical video buffer 52 is dropped to make room for the newly encoded video data. In conjunction with dropping the video data, physical video buffer 52 may provide feedback to encoding engine 50 indicating that video data will be dropped. In response to the feedback, encoding engine 50 may apply early error control techniques in the encoding process to mitigate the effects of the dropped video data on video quality.

Figure 4:
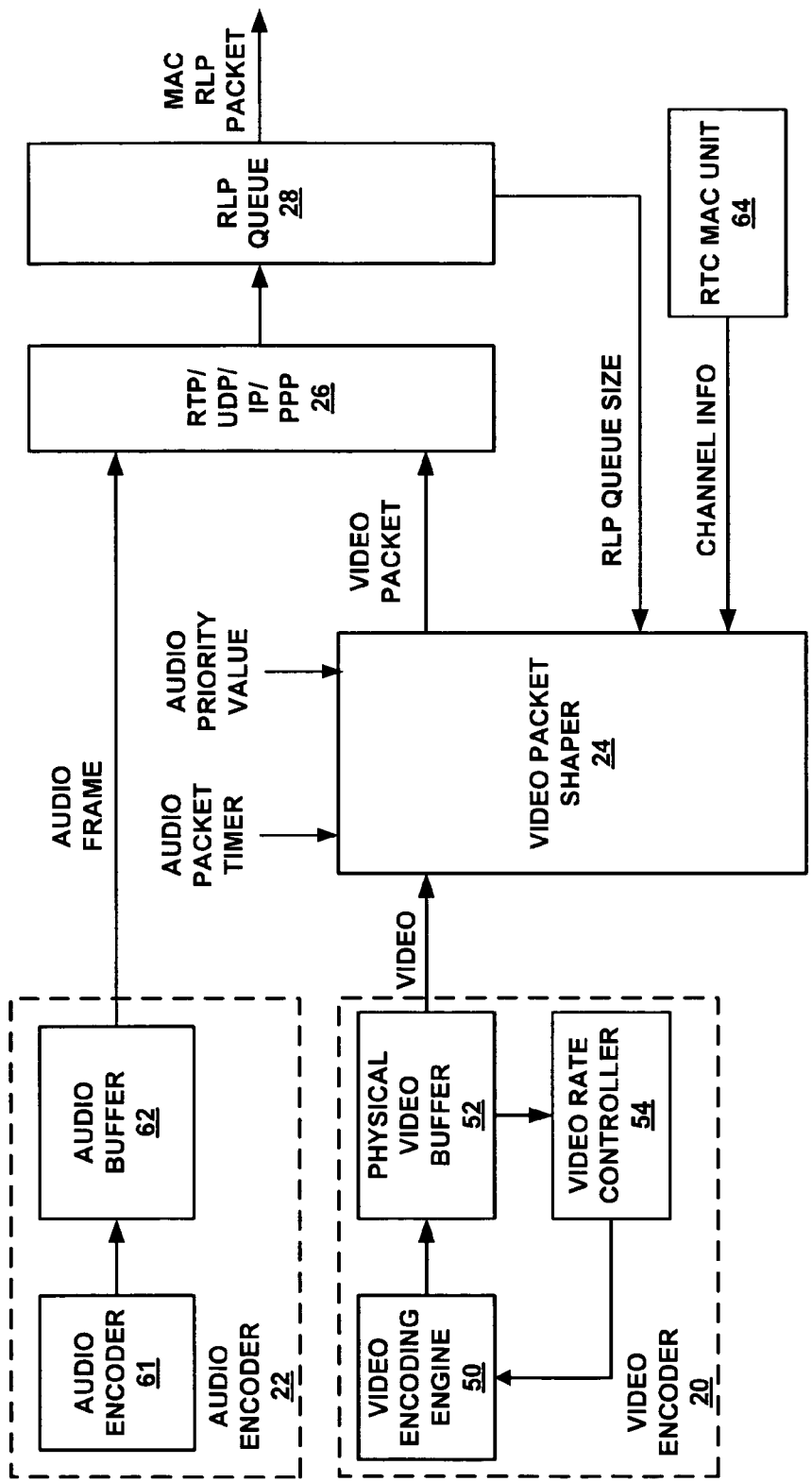
FIG. 4 is a block diagram illustrating integration of the video encoding system of FIG. 2 within an audio/video encoding system implementing channel-adaptive video packet shaping.

FIG. 4 is a block diagram illustrating integration of the video encoding system 10 of FIG. 2 within an audio/video encoding system implementing channel-adaptive video packet shaping. As mentioned previously, channel adaptive video source rate control may be used in conjunction with any video packetization scheme. In some applications, however, it may be desirable to apply channel adaptive video source rate control with a channel adaptive video packet shaping scheme, such as a video packet shaping scheme that prioritizes audio over video for transmission over channel 16, as described previously.

As shown in FIG. 4, video packet shaper 24 removes video data from physical video buffer 52 and packetizes the video data for delivery to RTP/UDP/IP/PPP conversion module 26. Again, the size of each packet may be determined according to channel conditions, as evidenced by channel information and RLP queue size received by video packet shaper 24. Audio encoder 22 includes an audio encoding engine 61 and an audio buffer/bundler 62. Audio encoding engine 61 encodes audio received from an audio source. Audio buffer/bundler 62 receives audio data from audio encoding engine 61 and generates audio frames for delivery to RTP/UDP/IP/

PPP conversion module 26. RTP/UDP/IP/PPP conversion module 26 places MAC RLP packets within RLP queue 28 for transmission over channel 16.

A reverse traffic channel (RTC) MAC unit 64 implements an RTC MAC protocol to provide the procedures followed by a communication device to transmit over the reverse link (RL) of channel 16. For convenience, MAC layer module 30 and PHY layer module 32 are not shown in FIG. 4. Video packet shaper 24 controls the size of each video packet based on one or more inputs. The inputs may relate to channel conditions, RLP queue characteristics, and audio packet size and status. Video packet shaper 24 generates video packets with a size estimated based on the inputs. The video packet size may be subject to a minimum size.

Video buffer 52 buffers video information received from video encoder 20, and stores the video information for packetization by video packet shaper 24. Audio buffer 62 buffers audio frame information received from audio encoder 22 and passes the information to RTP/UDP/IP/PPP conversion module 26. Audio and video packets are inserted in RLP queue 28 independently of one another. The size of the video packets produced by video packet shaper 24 may be controlled to ensure that there will be sufficient space for an audio packet in the next available MAC RLP packet produced by MAC layer module 30 (not shown in FIG. 4). In particular, RLP queue 28 is not overwhelmed with video packets, ensuring that the audio packet in the RLP queue can be sent with the next MAC RLP packet.

In the example of FIG. 4, video packet shaper 24 may receive several inputs, including an audio packet timer, an audio priority value, RLP queue size, and channel information. The audio packet timer indicates whether audio information is presently available in audio buffer 62 and, if so, the timing at which each audio frame will be delivered. If audio frames are delivered at intervals of every 20 ms, for example, the audio packet timer will be set to 20 ms when audio frames are available. In some embodiments, audio buffer 62 may be configured to bundle successive audio frames for incorporation in a single packet. In this case, the audio packet timer may be a multiple corresponding to the number of frames bundled into the audio packet. In other words, the audio packet timer may have a value that is proportional or otherwise related to the number of bundled frames. If three audio frames are bundled, for example, the audio timer may be set to 60 ms. Hence, the audio packet timer also indicates the size of the audio packet generated by audio buffer 62 for insertion in RLP queue 28 via RTP/UDP/IP/PPP conversion module 26.

The audio priority value defines the relative priorities of audio and video, and hence influences the delays associated with audio and video. For example, the audio priority value may be established such that the smaller the priority value, the lower the audio delay. Accordingly, as the audio priority value increases, audio delay increases and video delay decreases. Conversely, as the audio priority value decreases, audio delay decreases and video delay increases. Hence, audio delay tracks the audio priority value. Video packet shaper 24 may use the audio priority value to control the size of each video packet, resulting in a prescribed audio packet delay, as will be described in greater detail below.

The RLP queue size received by video packet shaper 24 represents the size of the current data buffered in RLP queue 28. Video packet shaper 24 uses the RLP queue size to control the size of the video packets. If RLP queue 28 is relatively full, video packet shaper 24 may adjust the size of the video packets downward to avoid overwhelming the RL and causing excessive audio delay. If RLP queue 28 is less full, video packet shaper 24 may increase the size of the video packets while still providing sufficient space for audio packets. With RLP queue size, video packet shaper 24 is able to dynamically adjust video packet size as a function of the fullness of RLP queue 28. RLP queue fullness may indicate excessive video content, degradation of channel conditions, or both. The use of RLP queue size is one of the ways in which video packet shaper 24 can react to overloading of video content or changes in channel conditions.

Video packet shaper 24 also may react more directly to changes in channel conditions by monitoring channel information provided by reverse traffic channel (RTC) MAC unit 64. RTC MAC unit 64 generates information relating to channel characteristics, such as current MAC RL rate, combined RA bit, and headroom limitation. The MAC RL rate indicates the current transmission rate available over the RL. The RA bit is the reverse activity bit, which indicates whether the pertinent wireless base station is busy. The headroom limitation may indicate the maximum rate that is allowed to be used in transmission, based on the current transmit power. The RA bit indicates when the RL is congested or unavailable due to base station inactivity. The PA limit represents transmit power headroom and indicates when channel conditions have degraded.

Based on the various inputs, video packet shaper 24 generates a payload size estimate. The payload size estimate is selected to permit an audio packet to be included in the next available MAC RLP packet, if the audio priority value specifies that audio is to be accorded high priority. Video packet shaper 24 receives video from video buffer 52 and packetizes the video based on the payload size estimation and a minimum video packet size. The minimum video packet size represents the minimum size of video packets to be produced by video packet shaper 24. In effect, minimum video packet size controls the granularity of video packet size and bandwidth efficiency. For smaller minimum video packet size values, video packet shaping is more effective in terms of accommodating audio and thereby avoiding audio delays, but less bandwidth efficient. For larger minimum video packet size values, video packet shaping is less effective in avoiding audio delays, but provides greater bandwidth efficiency.

As further shown in FIG. 4, video encoder 20 is configured to include video rate controller 54, which responds to a physical video buffer fullness value from physical video buffer 52. Video encoder 20 provides an adaptive source rate control feature based on video buffer fullness. When video buffer 52 is relatively full, video rate controller 54 responds by reducing the video encoding rate applied by video encoding engine 50. When video buffer 52 is less full, video rate controller 54 increases the source video encoding rate. In this manner, the video encoding rate is reduced if channel conditions cannot support the current video encoding rate. As described herein, this channel-adaptive source rate control feature may be implemented as a dual-buffer frame budget estimation technique. Additional details of the dual-buffer frame budget estimation technique are described below.

In general, video rate controller 54 controls the video source encoding rate based on the status of physical video buffer 52 and a virtual video buffer maintained by the video rate controller. Physical video buffer 52 receives frames of video encoded by video encoding engine 50. Virtual video buffer 60 (FIG. 3) is updated on a frame by frame basis to represent an amount of encoded video relative to a target encoding rate. The target encoding rate may be characterized by a target bit rate R and a target frame rate F. An example of a target bit rate R is 24 Kilobits per second (Kbps). An example of a target frame rate is 7.5 frames per second (fps). A virtual buffer fullness value can be represented by the following expression:

$$Wn = \max(Wn-1+Bn-1-R/F, 0) \quad (1)$$

where Wn is the virtual buffer fullness at encoded video frame n, Wn−1 is the virtual buffer fullness at frame n−1, Bn−1 is the actual number of coding bits used by video encoding engine 50 to encode frame n−1, R is the target bit rate and F is the target frame rate. Expression (1) generates the maximum of either zero or Wn−1+Bn−1−R/F. If the value Wn−1+Bn−1−R/F is negative, the amount of encoded video is relatively low.

Buffer information unit 58 (FIG. 3) generates a buffer value Xn based on the fullness of physical video buffer 52 and virtual video buffer 60. For example, the buffer value Xn may be represented by the following expression:

$$Xn = \max(w*Vn, Wn) \quad (2)$$

where the coefficient w is a positive integer and Vn represents the fullness of physical video buffer 52 at frame n. The coefficient w is a weighting value that determines the weight to be accorded to physical video buffer fullness versus virtual video buffer fullness. Expression (2) produces the greater of w*Vn or Wn as the buffer value Xn.

Rate control unit 56 uses the buffer value Xn to determine whether to skip the next frame. In particular, if the buffer value Xn is greater than or equal to the skipping threshold Tskip (i.e., Xn>=Tskip), then rate control unit 56 instructs video encoding engine 50 to skip encoding of the next frame n+1. When Xn meets or exceeds the skipping threshold Tskip, either video encoder 20 is in danger of exceeding its bit constraints, as evidenced by the virtual video buffer fullness, or the physical video buffer 52 is too full, e.g., due to channel conditions. For example, if channel conditions are poor, video packet shaper 24 may reduce the size of the video packets removed from the physical video buffer 52 and/or the rate at which the packets are removed. In this case, it is necessary to reduce the encoding rate applied by video encoder 20. Channel-adaptive video packet shaping provides an interface that bridges channel condition and video source rate control. The buffer value Xn transforms the channel condition information into video buffer fullness, which provides an indirect indication of channel throughput.

If the buffer value Xn does not meet or exceed the skipping threshold Tskip (i.e., Xn<Tskip), rate control unit 56 (FIG. 3) determines a frame budget defining an number of bits allocated to encode the next frame. Rate control unit 56 may determine the frame budget Bn for frame n according to the following expression:

$$Bn = R/F - \Delta \quad (3)$$

where $\Delta = Xn/F$ if $Xn > Z*Tskip$, $\Delta = Xn - Z*Tskip$ if $Xn <= Z*M$, and Z is a coefficient. In general, the delta value $\Delta$ is a function of buffer fullness (Wn or Vn), frame rate (F), and channel throughput (R). The value R, the target bit rate, represents channel throughput. The value F, the target frame rate, represents the rate at which frames can be transmitted. The value R/F, i.e., channel throughput R divided by frame rate, represents the channel throughput per frame.

If the buffer value is greater than Z times the skipping threshold Tskip, the virtual or physical buffer, as applicable, is relatively full. In this case, the buffer value Xn is divided by the frame rate F, and the result is subtracted from R/F, which is the target bit rate divided by the target frame rate. In general, this value of $\Delta(=Xn/F)$ will result in a reduction in the encoding rate applied by video encoding engine 50. If the buffer value is less than or equal to Z times the skipping threshold Tskip, the applicable virtual or physical buffer has sufficient space to accommodate more encoded video. In this case, the buffer value the product of Z times the skipping threshold Tskip is subtracted from the buffer value Xn. In general, this value of $\Delta(=Xn-Z*Tskip)$ will result in an increase in the encoding rate applied by video encoding engine 50.

As an illustration, in one implementation, the following requirements may be applied to the video source rate control applied by video encoder 20. If channel bit rate R is 48 Kbps (6000 bytes/second) and frame rate is 15 fps, the corresponding frame budget is 480000/15=3200 bits=400 bytes. Assuming a 0.4 to 0.6 second maximum end-to-end delay requirement (e.g., 400 to 600 ms, and more particularly 500 ms), the physical video buffer delay requirement is less than or equal to 200 milliseconds (ms). In this case, the size of virtual video buffer 60 can be set to 1200 bytes (200 ms*6000 bytes/second). To meet the above requirements, the video source rate control design should have a physical video buffer fullness that is less than or equal to 1200 bytes for every frame. In addition, the encoder buffering delay in the physical video buffer 52 should be less than or equal to 200 ms for every frame.

Video encoder 20 reduces the video encoding rate when RL throughput decreases, but gracefully adapts to RL throughput to prevent over- or under-reaction to the RL throughput. Ideally, there should be no buffer underflow, or minimal buffer underflow, as well as no buffer overflow or minimal buffer overflow, in physical video buffer 52. Buffer underflow indicates underutilization of bandwidth, while buffer overflow results skipped frames, i.e., skipping the encoding of frames when there is insufficient space in physical video buffer 52 to accommodate the encoded video frame. With the dual buffer based rate control scheme described herein, end-to-end video delay can be reduced while enhancing spatial quality. In this manner, a good balance can be achieved to substantially maximize encoding quality at a given amount of bandwidth. For example, it is possible to meet a strict low end-to-end delay requirement, e.g., less than or equal to 500 ms, with low frame skipping and no or minimal buffer underflow.

The virtual video buffer 60 helps meet the delay requirement by using buffer-based bit allocation and frame skipping. The physical video buffer 52 permits adaptation of the video encoding rate to channel conditions. According to expressions (1)-(3) above, the virtual video buffer fullness value Wn is used for rate control when channel conditions are good. The physical video buffer fullness value Vn from the RTP layer is used to reduce the encoding rate when the channel condition is poor. In this manner, it is possible to meet an allocated frame budget under varying channel conditions due to time-varying channel throughput. MB-level rate control serves as another feature to improve the accuracy of rate control. With such features, overall end-to-end visual quality can be enhanced for a given bit rate, supporting more effective audio-video communication, e.g., in a VT application or in other applications.

Figure 5:
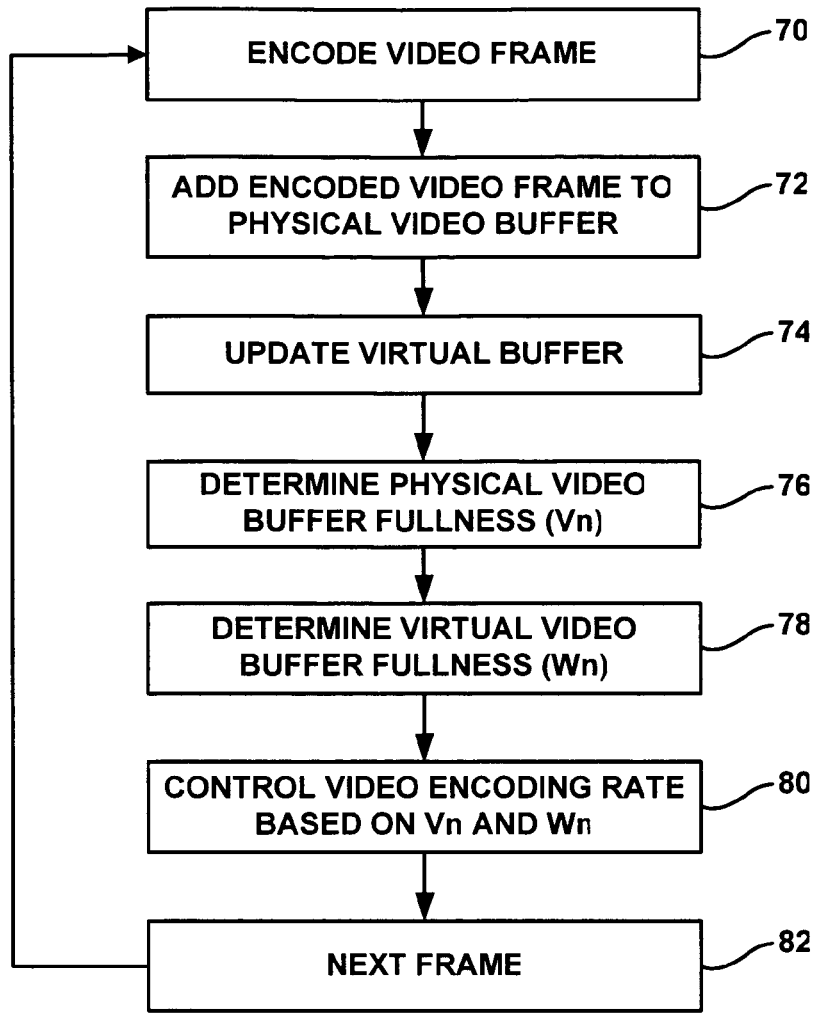
FIG. 5 is a flow diagram illustrating a technique for video source rate control.

FIG. 5 is a flow diagram illustrating a technique for video source rate control. In the example of FIG. 5, video encoding engine 50 encodes a video frame n−1 (70) and adds the encoded video frame to physical video buffer 52 (72). Rate control unit 56 updates the virtual buffer 74 for the next frame n, e.g., according to expression (1), yielding a new virtual buffer fullness value Wn (74). In updating the virtual video buffer, Bn−1 is the amount of bits used by video encoding engine 50 to encode the frame n−1 added to physical video buffer 52. Buffer information unit 58 determines the physical video buffer fullness value Vn (76) and the virtual video buffer fullness value Wn (78). Rate control unit 56 controls the video encoding rate of video encoding engine 50 based on the physical video buffer fullness value Vn and the virtual video buffer fullness value Wn (80). Then, the process proceeds to the next frame to be encoded (82), and repeats.

Figure 6:
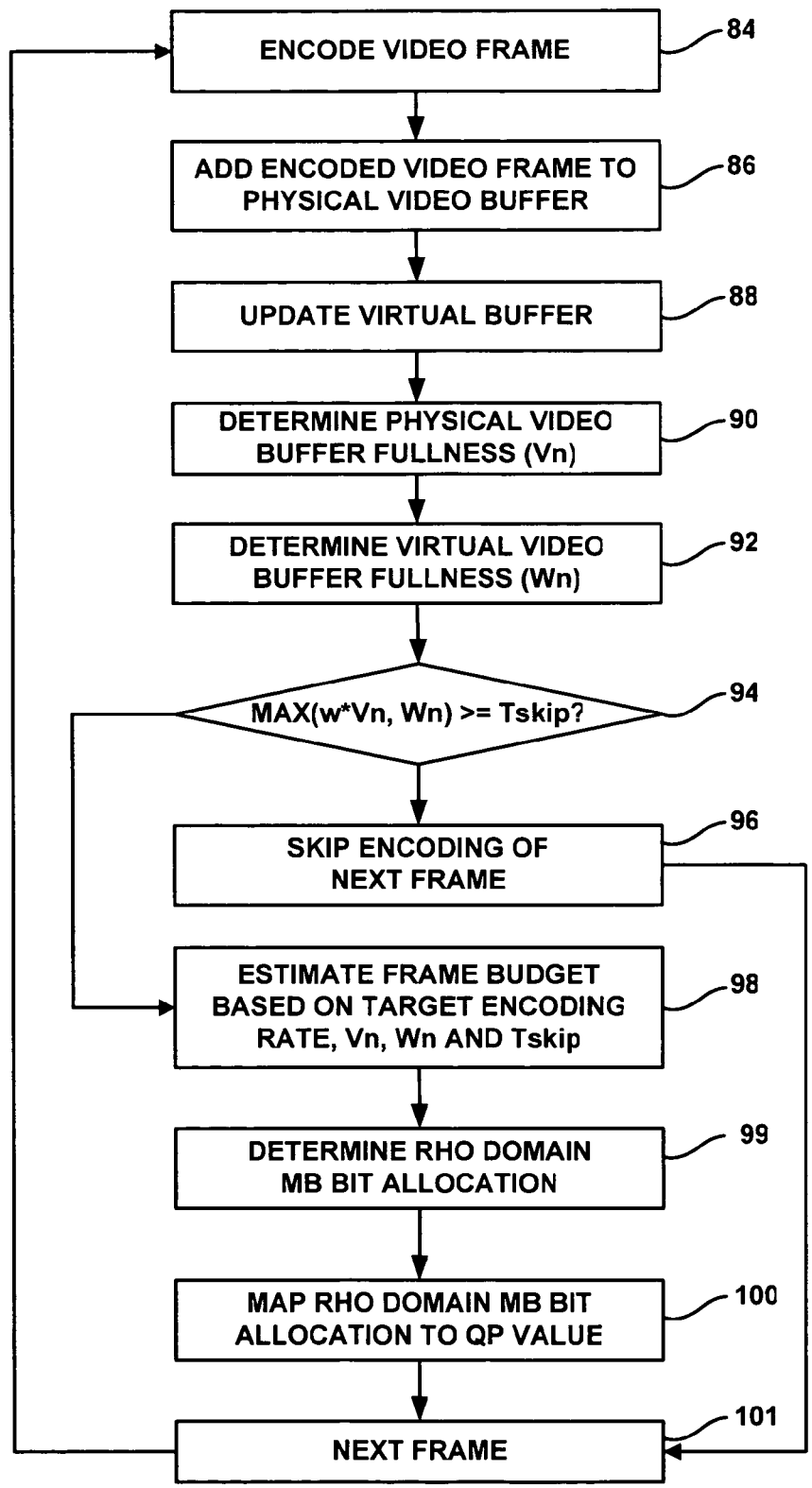
FIG. 6 is a flow diagram illustrating a technique for video source rate control in greater detail.

FIG. 6 is a flow diagram illustrating a technique for video source rate control in greater detail. In the example of FIG. 6, video encoding engine 50 encodes a video frame n−1 (84) and adds the encoded video frame to physical video buffer 52 (86). Rate control unit 56 updates the virtual buffer 74 for the next frame n, e.g., according to expression (1), yielding a new virtual buffer fullness value Wn (88). Buffer information unit 58 determines the physical video buffer fullness value Vn (90) and the virtual video buffer fullness value Wn (92). Rate control unit 56 receives a buffer value Xn from buffer information unit 58. The buffer value Xn=max (w*Vn, Wn), where w is a weighting coefficient. This corresponds to expression (2) above. If max (w*Vn, Wn) is greater than or equal to the skipping threshold Tskip (94), rate control unit 56 instructs video encoding engine 50 to skip the encoding of the next frame n (96). Upon skipping the next frame n, the process proceeds to the next frame after the skipped frame (101), and repeats.

If max (w*Vn, Wn) is not greater than or equal to the skipping threshold Tskip (94), rate control unit 56 estimates a frame budget for the next frame based on the target encoding rate, e.g., target bit rate R and target frame rate F, the physical video buffer fullness value Vn, the virtual video buffer fullness value Wn, and the skipping threshold Tskip (98). In particular, rate control unit 56 may apply expression (3) above to determine the frame budget Bn, which defines the number of bits available to encode the next frame. Upon determining the frame budget, rate control unit 56 may direct video encoding engine 50 to allocate the bits in the frame budget evenly over the video blocks, e.g., macroblocks (MBs), within the frame to be encoded. Alternatively, the frame budget bits may be allocated using a rho domain MB bit allocation (99). The rho domain MB bit allocation for each MB may then be mapped to a corresponding QP value (100). Once the encoding rate is determined for the current frame, the process proceeds to the next frame (101), and repeats.

The techniques described in this disclosure may be implemented within a general purpose microprocessor, digital signal processor (DSP), application specific integrated circuit (ASIC), field programmable gate array (FPGA), or other equivalent logic devices. For example, video encoder system 12, and its components and modules, may be implemented as parts of an encoding process, or coding/decoding (CODEC) process, running on a digital signal processor (DSP), microprocessor, embedded core, or other processing device. Accordingly, components described as modules may form hardware components or programmable features of an encoding process, or a separate process.

In some embodiments, encoding functions may be divided among different hardware components. For example, frame-level rate control may be performed in an embedded logic core, and MB-level rate control may be performed in a DSP. As an illustration, given a target bit rate (R Kbps) and a frame rate (F fps), frame-level rate control within the embedded logic core may involve updating rate control model parameters, e.g., rho domain model parameters, after encoding each frame, estimating the frame budget B for the next frame, and mapping the frame budget to a frame QP (e.g., 1 to 31) using budget-to-rho and rho-to-QP mappings, e.g., via either a rho table or a rho parametric equation.

Upon post-processing of the QP values, including any additional constraints on frame QP, the embedded logic core sends the frame QP, rho budget and new model parameters to the DSP. The DSP then calculates the QP for each MB using the rho-to-QP mapping, and performs post-processing of the QP values. The DSP may preserve a rule that the MB delta QP value is within +2 and −2, as well as any additional constraints on MB QPs. Upon updating the rho domain model parameters after encoding a MB, the DSP repeats the process for the other MBs within the applicable video frame. After MB encoding is completed, the process returns to the embedded logic core to handle the next video frame to be encoded.

Video encoder system 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

Additional details of an exemplary video packet shaper 24 will now be described. The following description provides an example of a video packet shaping technique that may be useful with the video source rate control techniques described in this disclosure. However, techniques for video source rate control in accordance with this disclosure may be practiced with any of a variety of packet shaping techniques. Accordingly, the following details are provided for purposes of example and should not be considered limiting of the video source rate control techniques as broadly embodied and described in this disclosure.

In this example, video packet shaper 24 controls the size of each video packet provided to RTP/UDP/IP/PPP conversion module 26 (FIGS. 1 and 4) in order to prioritize transmission of audio. In particular, video packets are sized so that each audio packet can be accommodated by the next available MAC layer packet. Controlled sizing of video packets prevents audio delays caused by channel conditions, large video packets, or both. When an audio packet is available, it is placed in the RLP queue for inclusion in the next available MAC RLP packet generated by MAC layer module 30. The audio packet may be combined with a video packet that has been sized to permit space for placement of the audio packet within the MAC RLP packet.

Video packet shaper 24 is configured to be channel-adaptive in the sense that it is capable of adjusting video packet size based on channel conditions. In this manner, encoder system 12 can prioritize transmission of audio packets to avoid audio delays when channel conditions are poor. At the same time, video packet shaper 24 can ensure that audio prioritization does not result in video packets being under-packetized. In other words, video packet shaper 24 sizes video packets sufficiently small to permit inclusion of one or more audio packets in the next available MAC RLP packet, but not so small that excessive space in the MAC RLP packet is wasted. Consequently, video packet shaper 24 may support both prioritization of audio packets and efficient transmission of video packets.

As discussed above, video packet shaper 24 is provided to control the size of video packets submitted to RTP/UDP/IP/PPP conversion module 26. Video packet shaper 24 controls the size of video packets to prioritize transmission of audio packets in MAC RLP packets, and prevent video packets from overwhelming RLP queue 28. In this manner, the audio portion of a VT conference can be conveyed without substantial delay, even though the video portion may suffer from delay due to channel conditions. Although video may be compromised by channel conditions, video packet shaper 24 ensures that the parties to the VT conference are still able to smoothly carry on a verbal conversation.

The packet shaping technique applied by video packet shaper 24 may apply one or more rules to ensure prioritized transmission of audio packets. According to one rule, for example, an audio packet should be sent in the very next available MAC RLP packet generated from the contents of RLP queue 28. Audio frames are generated by audio encoder 22 at first periodic intervals. MAC RLP packets are generated by MAC layer module 30 at second periodic intervals. The audio frame generated at a given interval should be placed in the next available MAC RLP packet generated by MAC layer module 30. In some embodiments, as an option, the total output queue size of RLP queue 28 along with the audio packet size should be able to be carried in one MAC RLP packet.

Various rules may be applied with respect to every packet of a VT sequence. Although some video packets may be inherently sized in a manner that ensures that audio and video can be carried in a single MAC RLP packet, other video packets may be larger and require size reduction in order to ensure that audio and video can be carried in a single MAC RLP packet, particularly when channel conditions degrade. By applying the techniques with respect to every packet of a VT sequence, satisfactory speech communication can be ensured even if the content of the video is expansive or channel bandwidth is substantially limited.

The size of each video packet submitted to RTP/UDP/IP/PPP conversion module 26 by packet shaper 24 for insertion in RLP queue 28 is controlled. The above rule ensures that audio packets are not delayed due to consumption of successive MAC RLP packets by expansive video content. Instead, when audio is available, video from video encoder 20 is divided into packets with sizes selected to permit each MAC RLP packet to carry audio and video. Each audio frame may be used as the audio packet provided to RLP queue 28. Alternatively, in some embodiments, an audio packet may bundle multiple audio frames provided at successive intervals.

Video packet shaper 24 may determine the video packet size for each MAC layer packet, in some embodiments, based on an estimated channel throughput for the MAC layer packets generated between successive audio frames. The throughput may be estimated based on channel conditions, as represented by one or more of current wireless channel transmit rate, wireless base station activity, and transmit power limitations. For example, the channel conditions may be determined based on current MAC layer data rate, a reverse activity (RA) bit, and a power amplifier (PA) limit. In addition, in some embodiments, video encoder 20 may further include adaptive source rate control based on video buffer occupancy. In this case, the source video encoding rate may be reduced by video encoder 20 if the channel conditions do not support the video encoding rate, given the need for prioritized audio packetization.

Audio encoder 22 generates audio frames, and video encoder 20 generates video frames. A series of successive MAC RLP packets are available to carry audio packets and video packets derived from the frames, which are buffered in RLP queue 28. Following generation of a first audio frame by audio encoder 22, the next available MAC RLP packet generated by MAC layer module 30 carries the first audio frame. A second packet also can be used to carry the first audio frame, if necessary. If the contents of RLP queue 28 is overwhelmed by video packets, however, the first audio frame may not be delivered for a long period of time.

Each MAC RLP packet has an associated data rate derived from RL channel condition information. Under good RL conditions, each MAC RLP packet may carry a data rate of 76.8 Kilobits per second (Kbps). Under poor RL channel conditions, however, data rate fluctuates and is often low, e.g., 19.2 Kbps or 38.4 Kbps. Excessive video content, poor channel conditions, or both can cause significant delays in transmission of audio packets. Excessive video packet size can overwhelm the RL and increase audio delay, particularly when RL throughput is reduced due to low data rates.

A video packet, if left uncontrolled, may consume an excessive amount of the MAC RLP packet space, resulting in delays between successive transmissions of audio packets. In some cases, video may consume several consecutive MAC RLP packets, preventing audio from being transmitted promptly. Each MAC RLP packet provides roughly 26.67 ms of space for incorporation of audio and video packet information. Consider the case in which a large video frame is generated at substantially the same time as an audio frame. In this scenario, assume that successive video frames are generated 133 ms from one another in time. However, successive audio frames are generated only 60 ms from one another in time.

Even under good RL conditions, there may be insufficient space for incorporation of audio packets for the first audio frame, as well as for second and third audio frames. Instead, video packets associated with the large video frame may consume most of MAC RLP packets, resulting in significant audio delays. This problem is especially challenging when channel condition degrades, as in the case of Poor RL condition. To alleviate audio delays under a variety of channel conditions, system 10 of FIG. 1 may incorporate video packet shaper 24, which controls the size of video packets derived from video frames. By applying video limits with respect to every packet of a VT sequence, video packet shaper 24 can ensure that the audio associated with the VT sequence is not compromised.

Fixed length video packet shaping presents a partial solution to the problem of audio delay. However, fixed length video packet shaping does not consider channel conditions. Consequently, video can still overwhelm the channel when RL throughput is reduced. In addition, fixed length packet shaping does not consider the throughput between two successive audio packets, resulting in over- or under-packetization of video data.

For fixed length video packet shaping, the size of video packets is controlled by fragmenting video frames into fixed size packets (e.g., 300-bytes) every 60 ms. Audio frames are also fragmented into fixed-size packets, e.g., every 60 ms. Video packets are transmitted immediately after audio data packets within MAC RLP packets. Under normal operating conditions, fixed length video packetization promotes the timely transmission of audio packets within MAC RLP packets.

The fixed length video packet shaping approach ensures that audio packets are transmitted without delay under good RL conditions. If RL conditions degrade, however, the fixed length video packets can overwhelm the RL, resulting in delays between successive audio packets. Due to the fixed length of video packets, there is no ability to react to changes in RL conditions. In some instances, under good RL conditions, the video data may be underpacketized, resulting in underutilization of the space provided by each MAC RLP packet, and general bandwidth inefficiency. Under poor RL conditions, the fixed size of the video packet may be too large for the RL to handle, resulting in audio delay. For this reason, channel-adaptive video packet shaping may be provided to produce adjustable length video packets, which have sizes that are adaptable in response to video content or bandwidth in order to maintain quality audio for an entire VT sequence.

For channel-adaptive video packet shaping, video packet size is adjusted based on channel conditions so that audio packets can be transmitted without substantial delay. Instead of a fixed video packet size, the size of each video packet is dynamically adjusted based on the size of audio packets and channel conditions. Under good RL conditions, video packet size may be increased, but not to the point that the video packets would overwhelm the RL and introduce audio delay. Under poor RL conditions, video packets are reduced in size to provide room for an audio frame to be packetized and placed in the next available MAC RLP packet.

When audio frames are available, video frames are sized so that the respective audio frame can be placed in the next available MAC RLP packet. Each audio frame is packetized and then placed in RLP queue 28 for inclusion in the next available MAC RLP packet generated by MAC layer module 30, eliminating excessive delay between transmission of audio packets. Each MAC RLP packet may carry only audio, only video, or both audio and video, depending on the contents of RLP queue 28. However, at each audio packet interval, a video packet is sized to permit incorporation of the audio packet in the next available MAC RLP packet.

Notably, as the available RL rate is reduced, e.g., due to channel conditions, the size of the audio packet increases relative to the size of the MAC RLP packet. In other words, each audio packet consumes a greater proportion of the MAC RLP packet as RL rate decreases because video packet size is reduced. Conversely, the size of each video packet is dynamically adjusted so that it consumes a smaller proportion of the MAC RLP packet as RL rate decreases. In this way, video packets are sized to permit placement of each audio packet within the next available MAC RLP packet. The result is that audio is given higher priority than video to reduce audio delay.

RTC MAC unit 64 (FIG. 4) may be configured to implement an RTC MAC protocol to provide the procedures followed by a communication device to transmit over the RL. In a particular embodiment, video packet shaper 24 may include a payload size estimator that controls the size of each video packet based on one or more inputs. The inputs may relate to channel conditions, RLP queue characteristics, and audio packet size and status. Video packet shaper 24 also may include, in a particular embodiment, a bandwidth efficient packetizer that generates video packets based on an estimated payload size specified by the payload size estimator, subject to a minimum video packet size.

Video buffer 52 buffers video information received from video encoder 20, and passes the video information to video packet shaper 24. Audio buffer 62 buffers audio frame information received from audio encoder 22 and passes the information to RTP/UDP/IP/PPP conversion module 26. Audio and video packets are inserted in RLP queue 28 independently of one another. The size of the video packets produced by video packet shaper 24 ensures that there will be sufficient space for the audio packet in the next available MAC RLP packet produced by MAC layer module 30. In particular, RLP queue 28 is not overwhelmed with video packets, ensuring that the audio packet in the RLP queue can be sent with the next MAC RLP packet.

In this example, the payload size estimator of video packet shaper 24 receives several inputs, including an audio packet timer, an audio priority value ACPredNumberPlus, RLP queue size, and channel information. The audio packet timer indicates whether audio information is presently available in audio buffer 62 and, if so, the timing at which each audio frame will be delivered. If audio frames are delivered at intervals of every 20 ms, for example, the audio packet timer will be set to 20 ms when audio frames are available. In some embodiments, audio buffer 62 may be configured to bundle successive audio frames for incorporation in a single packet. In this case, the audio packet timer may be a multiple corresponding to the number of frames bundled into the audio packet. In other words, the audio packet timer may have a value that is proportional or otherwise related to the number of bundled frames. If three audio frames are bundled, for example, the audio timer may be set to 60 ms. Hence, the audio packet timer also indicates the size of the audio packet generated by audio buffer 62 for insertion in RLP queue 28 via RTP/UDP/IP/PPP module 26.

The audio priority value MACPredNumberPlus defines the relative priorities of audio and video, and hence influences the delays associated with audio and video. For example, MACPredNumberPlus is established such that the smaller the priority value, the lower the audio delay. Accordingly, as MACPredNumberPlus increases, audio delay increases and video delay decreases. Conversely, as the MACPredNumberPlus decreases, audio delay decreases and video delay increases. Hence, audio delay tracks the audio priority value MACPredNumberPlus. The payload size estimator of packet shaper 24 uses the MACPredNumberPlus value to control the size of each video packet, resulting in a prescribed audio packet delay, as will be described in greater detail below.

The RLP queue size received by the payload size estimator represents the size of the current data buffered in RLP queue 28. The payload size estimator uses the RLP queue size to control the size of the video packets. If RLP queue 28 is relatively full, the payload size estimator may adjust the size of the video packets downward to avoid overwhelming the RL and causing excessive audio delay. If RLP queue 28 is less full, the payload size estimator may increase the size of the video packets while still providing sufficient space for audio packets. With RLP queue size, the payload size estimator is able to dynamically adjust video packet size as a function of the fullness of RLP queue 28. Queue fullness may indicate excessive video content, degradation of channel conditions, or both. The use of RLP queue size is one of the ways in which the payload size estimator can react to overloading of video content or changes in channel conditions.

The payload size estimator of video packet shaper 24 also may react more directly to changes in channel conditions by monitoring channel information provided by RTC MAC unit 64. RTC MAC unit 64 generates information relating to channel characteristics, such as current MAC RL rate, combined RA bit, and headroom limitation. The MAC RL rate indicates the current transmission rate available over the RL. The RA bit is the reverse activity bit, which indicates whether the pertinent wireless base station is busy. The headroom limitation may indicate the maximum rate that is allowed to be used in transmission, based on the current transmit power. The RA bit indicates when the RL is congested or unavailable due to base station inactivity. The PA limit represents transmit power headroom and indicates when channel conditions have degraded.

Based on the various inputs, the payload size estimator of video packet shaper 24 generates a payload size estimate. The payload size estimate is selected to permit an audio packet to be included in the next available MAC RLP packet, if the MACPredNumPlus priority value specifies that audio is to be accorded high priority. The bandwidth efficient packetizer of video packet shaper 24 receives video from video buffer 52 and packetizes the video based on the payload size estimation specified by the payload size estimator and a minimum video packet size. The minimum video packet size represents the minimum size of video packets to be produced by video packet shaper 24. In effect, minimum video packet size controls the granularity of video packet size and bandwidth efficiency. For smaller minimum video packet size values, video packet shaping is more effective in terms of accommodating audio and thereby avoiding audio delays, but less bandwidth efficient. For larger minimum video packet size values, video packet shaping is less effective in avoiding audio delays, but provides greater bandwidth efficiency.

Additional implementation details will be described for purposes of illustration. Again, such details should considered exemplary, and not limiting of the techniques broadly embodied and described in this disclosure. For a cdma2000 1x EV-DO Rel. 0 implementation, RL throughput can be estimated based on channel conditions. 3 GPP2 Specification C.S0024-A (also referred to as TIA IS-856-A), at page 11-143, Table 11.9.6.1 specifies minimum and maximum payload sizes in bytes for a MAC RLP packet given different channel conditions expressed in terms of transmission rate in Kbps. Table 11.9.6.1 is reproduced below:

TABLE

| Transmission Rate (Kbps) | Minimum Payload Size (bytes) | Maximum Payload Size (bytes) |
|---|---|---|
| 9.6 Kbps | 1 | 29 |
| 19.2 Kbps | 30 | 61 |
| 38.4 Kbps | 62 | 125 |
| 76.8 Kbps | 126 | 253 |
| 153.6 Kbps | 254 | 509 |

If each transmission level in the above table is expressed as an index value, then the maximum payload size of each MAC RLP packet, including both audio and video, is as follows:

$$\text{Maximum payload size} = 2^{index+4} - 3.$$

For the above expression, index values 1, 2, 3, 4, and 5 are assigned to transmission rate levels of 9.6, 19.2, 38.4, 76.8 and 153.6 Kbps, respectively.

Audio frames and video frames are packetized and included in MAC RLP packets. The MAC RLP packets each have an associated RL transmission rate, and are capable of carrying different maximum payload sizes corresponding to those transmission rates. For example, some MAC RLP packets may have RL transmission rates of 38.4 Kbps and are each capable of carrying a maximum payload size of 125 bytes. Other MAC RLP packets may have an RL transmission rate of 76.8 Kbps and be capable of carrying a maximum payload size of 253 bytes. Still other MAC RLP packets may have RL transmission rates of 19.2 Kbps and are each capable of carrying a maximum payload size of 61 bytes.

In an exemplary embodiment, the operation of the payload size estimator of video packet shaper 24 can be expressed as an algorithm in pseudo code. The algorithm relies on the following inputs: RA Bit, PA Limit, RL Rate, RLPQueueSize, AudioPacketSize, and MACPredNumberPlus. AudioPacketSize may be derived from an audio packet timer applied to video packet shaper 24. As mentioned previously, the combined RAbit is the reverse activity bit indicating the status of base station activity, PA Limit represents the transmit power headroom limitation imposed by power requirements and indicates when channel conditions have degraded, RL rate is the transmission rate of the RL, RLPQueueSize indicates fullness of RLP queue 28, and AudioPacketSize indicates the size of the current audio packet, i.e., the audio packet to be added to the next available MAC RLP packet. MACPredNumberPlus indicates the relative priority to be accorded to audio packets versus video packets. The output of the algorithm is VideoPayloadSize.

For initialization of the algorithm, the value MACPredNumber is set as follows:

MACPredNumber=floor
((AudioFramesBundled*AudioFrameInterval)/
26.67)+1+MACPredNumberPlus MacPredNumber represents the number of MAC RLP packets necessary to carry a packet containing a single audio frame or set of bundled audio frames. AudioFrameInterval represents the time interval between audio frames. The value 26.67 is the time allocated for each MAC RLP packet. Hence, if three audio frames are bundled and the audio frame interval is 20 ms, and MACPredNumberPlus is zero, indicating high audio priority, then MACPredNumber is 3. This means that the predicted number of MAC RLP packets for which video payload size will be estimated is 3.

For every bundled audio packet, after sending the bundled audio packets, the payload size estimator of video packet shaper 24 makes a MAC audio throughput determination. The MAC throughput determination may proceed as indicated by the following pseudo code:

```
MACThroughput = 0;
MACRateIncrease = 1 − RABit;
MACPredRate = CurRate;
for (i = 0; i < MACPredNumber; i++)
{
    MACPredRate = MIN(MIN(MACPredRate + MACRateIncrease, 4),
        PALimit);
    MACThroughput += (2^{MACPredRate+4} −3);
}
```

In the above MAC throughput determination, MACThroughput is the required throughput value for audio transmission, MACRateIncrease indicates whether the MAC RL rate will be increased based on reverse activity, CurRate is the current MAC RL rate, MACPredRate is the amount of increase in the MAC RL rate, expressed as an index value. As indicated above, MACThroughput is the maximum payload size available for each of the three predicted MAC RLP packets.

Given the maximum payload size MACThroughput for each MAC RLP packet, the video payload size estimator estimates the maximum video payload size (VideoPayloadSize) as follows:

VideoPayloadSize=MAX(MACThroughput−RLP−
QueueSize,0)

VideoPayloadSize=MAX(VideoPayloadSize−2*Au-
dioPacketSize−45,0), where RLPQueueSize indicates the fullness of RLP queue 28 and AudioPacketSize represents the size of the audio packet to be added to the next MAC RLP packet. The value 45 is a fixed number in bytes to account for RTP/UDP/IP/PPP overhead of header information introduced by RTP/UDP/IP/PPP conversion module 26. The value of this fixed overhead number could be different in other implementations.

For channel-adaptive video packet shaping over a range of channel conditions, the payload size estimator of video packet shaper 24 adapts to the changing channel conditions, as represented in part by RL transmission rate, to adjust the size of the video packet payload presented for incorporation in the MAC RLP packets generated by MAC layer module 30 from the contents of RLP queue 28. In one example, audio frames are generated at an interval of 60 ms. In this case, a decision is made every 60 ms concerning the available payload size in the next three MAC RLP packets.

At a first decision point, the current MAC RL rate is indexed at 3 to represent 38.4 Kbps, the RA bit is set at zero, the PA limit is equal to 4 and the RLP queue contains X1 bytes. In this case, according to the above formulas, the throughput for each of the next three MAC RLP packets is estimated to be 253 bytes. Accordingly, the overall throughput over the next three MAC RLP packets is 253+253+253 bytes minus the contents X1 already placed in RLP queue 28. Hence, the MACThroughput value at the first decision point 50 is 253+253+253−X1 bytes.

At a second decision point, 60 ms later, the current RL rate is again indexed at 3 and the PA limit is 4, but the RA bit is set to 1 instead of 0. In this case, the RA bit indicates that the base station is busy and results in a prediction of a reduced throughput over the next three MAC RLP packets. In particular, the estimated throughput MACThroughput is 125+125+125−X2 bytes, where X2 represents the contents of RLP queue 28 at the time of the second decision point 80.

At a third decision point, 60 ms after the second decision point, the RA bit is 0, but the RL rate has dropped to an index value of 2 (19.2 Kbps) and the PA limit has dropped to an index value of 2. Consequently, the overall throughput MACThroughput over the next three MAC RLP packets decreases to 61+61+61−X3 bytes, where X3 represents the contents of RLP queue 28 at the time of the third decision point 82.

When MACThroughput is reduced, the space available for video packets is also reduced as a result of prioritization of the audio packets. In this case, the payload size estimator of video packet shaper 24 reduces the estimated size of the video payload for packetization. When MACThroughput increases, however, the payload size estimator responds by increasing the estimated video payload size. In this manner, video packet shaper 24 not only prioritizes audio packets, but also supports bandwidth-efficient video packetization.

In this example, decisions are made for three MAC RLP packets at a time. In other embodiments, however, a more aggressive decision process may be applied. For example, a decision for estimation of MACThroughput may be made every 20 ms. In a first 20 ms interval, a decision may be made for three MAC RLP packets. Then, in a second 20 ms interval, a decision may be made for the remaining two MAC RLP packets in a set of three successive MAC RLP packets. Finally, a decision may be made for the last MAC RLP packet in the three-packet set during the next 20 ms interval. In this case, decisions are made over the course of a 60 ms interval and updated every 20 ms for any changes that may have occurred in channel condition or RLP queue fullness. After 60 ms, the process repeats for the next 60 ms and the next three MAC RLP packets, and continues iteratively.

Once MACThroughput is estimated, the video payload size estimator estimates the video payload size that can be accommodated given the MACThroughput value, as explained above. Then, the bandwidth efficient packetizer uses the estimated video payload size and a minimum video packet size value to generate the video packet for submission to RTP/UDP/IP/PPP conversion module 26. The operation of the bandwidth efficient packetizer of video packet shaper 24 will now be described in greater detail.

In general, video packetization should conform to Network Working Group Request for Comment (RFC) 3016, dated November 2000, if MPEG4 video encoding is used, or to RFC 2190, dated September 1997, or RFC 2429, dated October 1998, if ITU H.263 video encoding is used. RFC3016 outlines the RTP payload format for MPEG4 streams. RFC2429 outlines the RTP payload format for the 1998 version of ITU H.263 streams, and RFC 2190 outlines the RTP format for the original version of ITU H.263 streams.

RFC 3016 specifies that a video packet (a) has to start with video object plane (VOP) header or video packet (VP) header, if any of them exists, (b) can contain more than one VP header, if previous rule is satisfied, (c) can contain only video data without any VOP and VP headers in it, and (d) cannot contain data across two video frames. RFC 2190 specifies that a video packet (a) has to start with picture start code (PSC) or group of blocks (GOB), (b) does not have to have GOB header or complete GOB, and (c) does not have to be GOB bytealigned. RFC2429 specifies that a video packet (a) can start with byte-aligned PSC, GOB header, Slice header, and end of slice (EOS) marker, and (b) can be a Follow-on packet that does not start with any synchronization codes but allows synchronization codes in the middle of the video packet.

Given the above requirements, video encoder 20 may be configured to insert video data into video buffer 52 in the form of VOPs and VPs for MPEG4, or PSCs, GOBs, and SSCs for H.263. An MPEG4-compliant encoder generates data in the units of VOP or VPs. An H.263 encoder generates data in the units of PSCs, GOBs or SSCs, with GOBs byte-aligned. When RFC 2190 is used, Mode A is the default.

In an exemplary embodiment, the operation of the bandwidth efficient packetizer of video packet shaper 24 can be expressed as an algorithm that makes use of the following inputs: VideoDataInBuffer, EstimatedVideoPayloadSize, minVPSize. VideoDataInBuffer represents the size of the video in video buffer 52. EstimatedVideoPayloadSize represents the estimated video payload size determined by the payload size estimator of video packet shaper 24. The value minVPsize is the minimum video packet size to be produced by video packet shaper 24, and serves to control granularity and bandwidth efficiency. The output of the bandwidth efficient packetization algorithm is one or more video packets for submission to RTP/UDP/IP/PPP conversion module 26. The operation of the bandwidth efficient packetizer, in an exemplary embodiment, is represented by the following pseudo code:

```
RemainingVideoPayloadSize = EstimatedVideoPayloadSize; VideoPayloadSize = 0;
    VideoPayloadData[ ] : an array;
for (;;)
    {
    if (RemainingVideoPayloadSize < minVPSize/2)
        RemainingVideoPayloadSize = 0;
    else if (RemainingVideoPayloadSize < minVPSize)
        RemainingVideoPayloadSize = minVPSize;
    If ((RemainingVideoPayloadSize == 0) || (VideoDataInBuffer == NULL)) break;
    If (VideoDataInBuffer->Size >= RemainingVideoPayloadSize + minVPSize)
```

```
{
    if (RemainingVideoPayloadSize >= (minVPSize/2))
    {
        if(RFC3016 || RFC2429)
            memcpy(VideoPayloadData + VideoPayloadSize, VideoDataInBuffer->Data,
                RemainingVideoPayloadSize);
            VideoPayloadSize += RemainingVideoPayloadSize;
            memcpy(VideoDataInBuffer->Data,
                VideoDataInBuffer->Data + RemainingVideoPayloadSize,
                VideoDataInBuffer->Size - RemainingVideoPayloadSize,
                VideoDataInBuffer->Size - = RemainingVideoPayloadSize);
            VideoDataInBuffer->Fragmented = 1;
        else if (RFC2190)
            memcpy(VideoPayloadData + VideoPayloadSize, VideoDataInBuffer->Data,
                VideoDataInBuffer->Size);
            VideoPayloadSize += VideoDataInBuffer->Size;
        }
        Make one VideoPacket from VideoPayloadData[ ] with payload size of
            VideoPayloadSize;
        RemainingVideoPayloadSize = 0;
    }
    else
    {
        memcpy(VideoPayloadData + VideoPayloadSize, VideoDataInBuffer->Data,
            VideoDataInBuffer->Size);
        VideoPayloadSize += VideoDataInBuffer->Size;
        Remaining VideoPayloadSize = MAX(RemainingVideoPayloadSize -
            VideoBufferSize->Size - 45, 0);
        if(No more data in buffer || the current TS != the next TS ||
            RemainingVideoPayloadSize == 0 || VideoDataInBuffer->
            Fragmented == 1)
        Make one VideoPacket from VideoPayloadData[ ] with payload size of
            VideoPayloadSize;
        VideoPayloadSize = 0;
        VideoDataInBuffer = the next frame/GOB/slice unit in the video buffer, if any, or
            NULL, if no more data
    }
}
```

As represented by the above pseudo code, the bandwidth efficient packetizer of video packet shaper 24 produces a video packet based on the EstimatedVideoPayloadSize provided by the payload size estimator and minVPSize. RemainingVideoPayloadSize represents the amount of payload still available at any point during the generation of a video packet. Initially, RemainingVideoPayloadSize is equal to the entire EstimatedVideoPayloadSize provided by the video payload size estimator. VideoPayloadSize represents the actual size of the video payload in a packet, and is initially set to zero. VideoPayloadData[ ] identifies an array of video data segments in video buffer 52.

The bandwidth efficient packetizer first determines whether the RemainingVideoPayloadSize is less than minVPSize/2. If so, the value RemainingVideoPayloadSize is set to zero. Alternatively, if RemainingVideoPayloadSize is less than minVPSize, then the value of RemainingVideoPayloadSize is set to equal minVPSize. Then, if RemainingVideoPayloadSize is equal to zero or VideoDataInBuffer is null, the process resets as there is either no space remaining in the next available MAC RLP packet or no video remaining in video buffer 52.

If the size of VideoInBuffer is greater than or equal to the value RemainingVideoPayloadSize plus the minVPSize, the bandwidth efficient packetizer next determines whether the RemainingVideoPayloadSize is greater than or equal to minVPsize/2. If so, the bandwidth efficient packetizer determines whether RFC3016 or RFC2429 is applicable. If neither RFC3016 or RFC2429 applies, then the bandwidth efficient packetizer determines whether RFC2190 is applicable, i.e., whether the RTP payload format for the original version of ITU H.263 applies.

If RFC3016 or RFC2429 applies, then the bandwidth efficient packetizer copies (memcpy) video from video buffer 52, as determined by the starting address VideoPayloadData and the offset VideoPayloadSize, to the input buffer identified by VideoDataInBuffer. Initially, VideoPayloadSize is set to zero. The amount of the video copied from video buffer 52 is equal to RemainingVideoPayloadSize, which is initially set to EstimatedVideoPayloadSize. The bandwidth efficient packetizer then adjusts VideoPayloadSize to equal RemainingVideoPayloadSize. Next, the bandwidth efficient packetizer copies the video data from the input buffer to the address identified by offset RemainingVideoPayload Size in an amount determined by RemainingVideoPayloadSize. The contents of VideoDataInBuffer is then fragmented for packetization.

If RFC2190 applies, then the bandwidth efficient packetizer copies (memcpy) video from video buffer 52, as determined by the starting address VideoPayloadData and the offset VideoPayloadSize, to the input buffer identified by VideoDataInBuffer. Again, VideoPayloadSize is initially set to zero. The amount of the video copied from video buffer 52 is equal to size of the VideoDataInBuffer. The VideoPayloadSize is then made equal to the size of VideoDataInBuffer.

Upon exiting either the RFC3016/RFC2429 operations or the RFC2190 operations, the bandwidth efficient packetizer next generates a VideoPacket from the VideoPayloadData with a payload size equal to the current value of VideoPayloadSize. The value RemainingVideoPayloadSize is then set to zero. At this point, a video packet has been generated by the bandwidth efficient packetizer for submission to RTP/UDP/IP/PPP conversion module 26. If RemainingVideoPayloadSize is not less than minVPSize, RemainingVideoPayloadSize is not equal to zero, VideoDataInBuffer is not null, and the size of VideoDataInBuffer is not greater than or equal to RemainingVideoPayloadSize+minVPSize, then the bandwidth efficient packetizer copies data from buffer 52 to VideoDataInBuffer using the address VideoPayloadData plus the offset of VideoPayloadSize. In this case, the amount of data copied is equal to VideoPayloadSize. Then, the bandwidth efficient packetizer sets VideoPayloadSize equal to the size of VideoDataInBuffer.

The bandwidth efficient packetizer of video packet shaper 24 next sets RemainingVideoPayloadSize equal to the maximum of RemainingVideoPayloadSize minus VideoBufferSize and zero. VideoBufferSize represents the size of video buffer 52. If there is no more data in video buffer 52, or a current timestamp (TS) is not equal to the next TS, or RemainingVideoPayloadSize is equal to zero, or VideoDataInBuffer is fragmented, the bandwidth efficient packetizer generates one VideoPacket from the VideoPayloadData with a payload size of VideoPayloadSize, and sets VideoPayloadSize to zero. Otherwise, the bandwidth efficient packetizer sets the VideoDataInBuffer to acquire the next frame, GOB, or slice unit in video buffer 52, if any, or null, if there is no more data in the video buffer.

As an example of channel-adaptive video packet shaping, assume that audio buffer 62 generates an audio packet. RTP/UDP/IP/PPP module 26 adds the audio packet to RLP queue 28. The payload size estimator of video packet shaper 24 determines RLP queue size, the audio-video priority value, and channel conditions. Based on those determinations, the payload size estimator of video packet shaper 24 estimates the payload size of the next video packet to be generated. The bandwidth efficient packetizer generates the video packet and sizes the video packet based on estimated payload size and a minimum video packet size. The bandwidth efficient packetizer adds the video packet to RLP queue 28. MAC layer module 30 generates a MAC RLP packet from the contents of RLP queue 28.

The techniques described in this disclosure may be implemented within a general purpose microprocessor, digital signal processor (DSP), application specific integrated circuit (ASIC), field programmable gate array (FPGA), or other equivalent logic devices. For example, video encoder system 12, video decoder system 14, and associated components and modules, may be implemented as parts of an encoding process, or coding/decoding (CODEC) process, running on a digital signal processor (DSP) or other processing device. Accordingly, components described as modules may form programmable features of such a process, or a separate process.

Video encoder system 12 may have a dedicated memory for storing instructions and data, as well as dedicated hardware, software, firmware, or combinations thereof. If implemented in software, the techniques may be embodied as instructions executable by one or more processors. The instructions may be stored on a computer-readable medium such as random access memory (RAM), read-only memory (ROM), non-volatile random access memory (NVRAM), electrically erasable programmable read-only memory (EEPROM), FLASH memory, magnetic or optical data storage device, or the like. The instructions cause one or more processors to perform certain aspects of the functionality described in this disclosure.

Various embodiments have been described. These and other embodiments are within the scope of the following claims.

The invention claimed is:

1. A method comprising:
adding encoded video to a physical video buffer;
removing a packet of the encoded video from the physical video buffer for transmission over a channel;
maintaining a virtual video buffer representing an amount of the encoded video relative to a target encoding rate; and
controlling an actual encoding rate of the video based on fullness of the physical video buffer and fullness of the virtual video buffer, wherein controlling the actual encoding rate includes skipping encoding of a video frame if a maximum of the fullness of the physical video buffer and the fullness of the virtual video buffer is greater than or equal to a skipping threshold.

2. The method of claim 1, further comprising estimating a frame budget defining a number of encoding bits available for a frame of the video if a maximum of the fullness of the physical video buffer and the fullness of the virtual video buffer is less than the skipping threshold, and controlling the actual encoding rate based on the frame budget.

3. The method of claim 2, wherein estimating a frame budget includes estimating the number of encoding bits based on a target bit rate, a target frame rate, the fullness of the physical video buffer, the fullness of the virtual video buffer, and the skipping threshold.

4. A computer-readable medium encoded with a computer program comprising instructions to cause one or more processors to:
add encoded video to a physical video buffer;
remove a packet of the encoded video from the physical video buffer for transmission over a channel;
maintain a virtual video buffer representing an amount of the encoded video relative to a target encoding rate; and
control an actual encoding rate of the video based on fullness of the physical video buffer and fullness of the virtual video buffer, wherein controlling the actual encoding rate includes skipping encoding of a video frame if a maximum of the fullness of the physical video buffer and the fullness of the virtual video buffer is greater than or equal to a skipping threshold.

5. The computer-readable medium of claim 4, wherein the computer program further comprises instructions to cause one or more processors to estimate a frame budget defining a number of encoding bits available for a frame of the video if a maximum of the fullness of the physical video buffer and the fullness of the virtual video buffer is less than the skipping threshold, and control the actual encoding rate based on the frame budget.

6. The method of claim 1, wherein the channel is a wireless channel, the method further comprising:
estimating throughput of the wireless channel; and
generating a video packet from the physical video buffer with a video packet size determined based on the estimated throughput.

7. The method of claim 1, further comprising:
estimating a frame budget defining a number of encoding bits available for a frame of the video based on the actual encoding rate; and
allocating rho domain values to macroblocks within the frame based on the frame budget.

8. The method of claim 7, further comprising mapping the rho domain values to corresponding quantization parameter (QP) values to allocate a number of encoding bits to each of the macroblocks.

9. A system comprising:
a video encoder;
a physical video buffer that stores video encoded by the video encoder;

a packet shaper that removes the encoded video from the physical video buffer for transmission over a channel;

a virtual video buffer representing an amount of the encoded video relative to a target encoding rate; and a controller that controls an actual encoding rate of the video based on fullness of the physical video buffer and fullness of the virtual video buffer, wherein the controller skips encoding of a video frame if a maximum of the fullness of the physical video buffer and the fullness of the virtual video buffer is greater than or equal to a skipping threshold.

10. The system of claim 9, wherein the controller estimates a frame budget defining a number of encoding bits available for a frame of the video if a maximum of the fullness of the physical video buffer and the fullness of the virtual video buffer is less than the skipping threshold, and controls the actual encoding rate based on the frame budget.

11. The system of claim 10, wherein the controller estimates the frame budget based on a target bit rate, a target frame rate, the fullness of the physical video buffer, the fullness of the virtual video buffer, and the skipping threshold.

12. The system of claim 9, wherein the channel is a wireless channel, wherein the packet shaper estimates throughput of the wireless channel, and generates the video packet from the physical video buffer with a video packet size determined based on the estimated throughput.

13. The system of claim 9, wherein the controller:
estimates a frame budget defining a number of encoding bits available for a frame of the video based on the actual encoding rate; and
allocates rho domain values to macroblocks within the frame based on the frame budget.

14. The system of claim 13, wherein the controller maps the rho domain values to corresponding quantization parameter (QP) values to allocate a number of encoding bits to each of the macroblocks.

15. A system comprising:
means for encoding video;
physical video buffer means for storing the encoded video;
packet shaping means for generating a video packet from the encoded video from the physical video buffer means for transmission over a channel;
virtual buffer means for maintaining a virtual video buffer representing an amount of the encoded video relative to a target encoding rate; and
control means for controlling an actual encoding rate of the video based on fullness of the physical video buffer and fullness of the virtual video buffer, wherein the control means includes means for skipping encoding of a video frame if a maximum of the fullness of the physical video buffer and the fullness of the virtual video buffer is greater than or equal to a skipping threshold.

16. The system of claim 15, wherein the control means includes means for estimating a frame budget defining a number of encoding bits available for a frame of the video if a maximum of the fullness of the physical video buffer and the fullness of the virtual video buffer is less than the skipping threshold, and means for controlling the actual encoding rate based on the frame budget.

17. The system of claim 16, wherein the means for estimating a frame budget includes means for estimating the number of encoding bits based on a target bit rate, a target frame rate, the fullness of the physical video buffer, the fullness of the virtual video buffer, and the skipping threshold.

18. The system of claim 15, wherein the channel is a wireless channel, and the packet shaping means includes means for estimating throughput of the wireless channel, and means for generating a video packet from the physical video buffer with a video packet size determined based on the estimated throughput.

19. The system of claim 15, wherein the control means includes:
means for estimating a frame budget defining a number of encoding bits available for a frame of the video based on the actual encoding rate;
means for allocating rho domain values to macroblocks within the frame based on the frame budget; and
means for mapping the rho domain values to corresponding quantization parameter (QP) values to allocate a number of encoding bits to each of the macroblocks.

20. The computer-readable medium of claim 5, wherein estimating the frame budget includes estimating the number of encoding bits based on a target bit rate, a target frame rate, the fullness of the physical video buffer, the fullness of the virtual video buffer, and the skipping threshold.

* * * * *